United States Patent
Samson et al.

(10) Patent No.: US 11,199,643 B2
(45) Date of Patent: Dec. 14, 2021

(54) MACHINE LEARNING APPROACH FOR IDENTIFYING MUD AND FORMATION PARAMETERS BASED ON MEASUREMENTS MADE BY AN ELECTROMAGNETIC IMAGER TOOL

(71) Applicant: HALLIBURTON ENERGY SERVICES, INC., Houston, TX (US)

(72) Inventors: Etienne M. Samson, Cypress, TX (US); Baris Guner, Houston, TX (US); Ahmed E. Fouda, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 170 days.

(21) Appl. No.: 16/579,513

(22) Filed: Sep. 23, 2019

(65) Prior Publication Data

US 2021/0088686 A1  Mar. 25, 2021

(51) Int. Cl.
*G01V 1/30* (2006.01)
*G01V 3/20* (2006.01)
(Continued)

(52) U.S. Cl.
CPC ............ *G01V 1/306* (2013.01); *E21B 49/005* (2013.01); *G01V 3/088* (2013.01); *G01V 3/20* (2013.01); *G06K 9/6269* (2013.01); *G06N 20/00* (2019.01)

(58) Field of Classification Search
CPC .......... G01V 1/306; G01V 3/20; G01V 3/088; G01V 3/28; G06N 20/00; E21B 49/005; G06K 9/6269
See application file for complete search history.

(56) References Cited

U.S. PATENT DOCUMENTS 5,780,850 A * 7/1998 DeLaune .............. E21B 49/005
                                                    250/255
5,869,968 A * 2/1999 Brooks .................... G01V 3/30
                                                    324/338

(Continued)

FOREIGN PATENT DOCUMENTS

WO  2018148492 A1  8/2018
WO  2018201114 A1  11/2018

OTHER PUBLICATIONS

Bayraktar et al. Quantitative interpretation of oil-base mud microresistivity imager via artificial neural networks (Year: 2019).*

(Continued)

*Primary Examiner* — Mohammad K Islam
(74) *Attorney, Agent, or Firm* — Polsinelli PC

(57) ABSTRACT

Aspects of the subject technology relate to systems and methods for identifying values of mud and formation parameters based on measurements gathered by an electromagnetic imager tool through machine learning. One or more regression functions that model mud and formation parameters capable of being identified through an electromagnetic imager tool as a function of possible tool measurements of the electromagnetic imager tool can be generated using a known dataset associated with the electromagnetic imager tool. One or more tool measurements obtained by the electromagnetic imager tool operating to log a wellbore can be gathered. As follows, one or more values of the mud and formation parameters can be identified by applying the one or more regression functions to the one or more tool measurements.

24 Claims, 11 Drawing Sheets

(51) Int. Cl.
*G06N 20/00* (2019.01)
*E21B 49/00* (2006.01)
*G06K 9/62* (2006.01)
*G01V 3/08* (2006.01)

(56) References Cited

U.S. PATENT DOCUMENTS

| | | | | |
|---|---|---|---|---|
| 6,337,568 | B1* | 1/2002 | Tutunji | G01N 24/081 |
| | | | | 324/303 |
| 9,081,117 | B2* | 7/2015 | Wu | G01V 3/32 |
| 9,678,239 | B2 | 6/2017 | Habashy et al. | |
| 10,400,586 | B2* | 9/2019 | Bittar | E21B 44/00 |
| 2010/0305863 | A1 | 12/2010 | Abubakar et al. | |
| 2011/0144913 | A1* | 6/2011 | Klein | G01V 3/20 |
| | | | | 702/13 |
| 2012/0080197 | A1 | 4/2012 | Dickens et al. | |
| 2013/0341091 | A1* | 12/2013 | Sugiura | G05B 15/02 |
| | | | | 175/24 |
| 2014/0076632 | A1* | 3/2014 | Wessling | E21B 47/06 |
| | | | | 175/48 |
| 2015/0114714 | A1* | 4/2015 | Dahl | E21B 49/005 |
| | | | | 175/40 |
| 2016/0245065 | A1* | 8/2016 | Gray | G01V 1/303 |
| 2018/0038987 | A1 | 2/2018 | Donderici | |
| 2018/0245465 | A1* | 8/2018 | Khan | G01N 9/36 |
| 2019/0094405 | A1* | 3/2019 | Itskovich | G01V 3/10 |
| 2019/0129026 | A1* | 5/2019 | Sumi | G01S 15/8997 |
| 2019/0196039 | A1* | 6/2019 | Wilson | G01V 1/28 |
| 2019/0271211 | A1 | 9/2019 | Mustapha et al. | |
| 2019/0369288 | A1* | 12/2019 | Abelian | G01V 13/00 |
| 2019/0383965 | A1* | 12/2019 | Salman | G01V 99/005 |
| 2020/0011158 | A1* | 1/2020 | Xu | G06N 20/00 |
| 2020/0132875 | A1* | 4/2020 | Zhang | E21B 47/003 |

OTHER PUBLICATIONS

Chen, Yong-Hua et al., "Inversion-Based Workflow for Quantitative Interpretation of the New-Generation Oil-Based-Mud Resistivity Imager", Society of Petrophysicists and Well-Log Analysts; SPWLA-2014-v55n6a2; Dec. 2014; abstract.

Weigend, Andreas S., On Overfitting and the Effective Number of Hidden Units; CU-CS-674-93, University of Colorado, Boulder, CU Scholar; Computer Science Technical Reports; Sep. 1, 1993.

Patil, Parimal A. et al., "Electrical Resistivity and Permittivity Measurements of Oil Base Muds in the Frequency Range from 1 MHz to 100 MHz", Society of Petroleum Engineers; SPE-118802-PA; Sep. 2010; abstract.

International Search Report and Written Opinion for International application No. PCT/US2019/052813, dated Jun. 19, 2020, 11 pages.

* cited by examiner

MACHINE LEARNING APPROACH FOR IDENTIFYING MUD AND FORMATION PARAMETERS BASED ON MEASUREMENTS MADE BY AN ELECTROMAGNETIC IMAGER TOOL

TECHNICAL FIELD

The present technology pertains to identifying values of mud and formation parameters based on measurements gathered by an electromagnetic imager tool, and more particularly, to identifying values of mud and formation parameters based on measurements gathered by an electromagnetic imager tool through machine learning.

BACKGROUND

Electromagnetic imager tools have been developed for generating images downhole in wellbores. Specifically, electromagnetic imager tools have been developed to operate in drilling mud to image formations surrounding a wellbore. In generating images, electromagnetic imager tools can exhibit a large number of complex responses that depend on a number of different factors. For example, impedance measurements of electromagnetic imager tools are not only a function of the formation resistivity but also a function of formation permittivity, mud resistivity, mud permittivity, borehole shape, standoff, and tool geometry. As a result of the complex responses that depend on a number of different factors, raw apparent resistivity images generated by electromagnetic imager tools may not depict the actual formation resistivity accurately. There therefore exist needs for systems and methods for accurately identifying values of mud and formation parameters from measurements made by electromagnetic imager tools. In particular, there exist needs for systems and methods for identifying values of mud and formation parameters from measurements made by electromagnetic imager tools while accounting for the large number of complex responses of the tools that depend on a number of different factors.

Inversion techniques have been developed to more accurately identify mud and formation parameters from measurements made by electromagnetic imager tools. Inversion techniques typically rely on simulating the response of an electromagnetic imager tool using a forward model to identify values of mud and formation parameters from the response. However, inversion techniques are costly from both a computational resource usage perspective and also a time perspective. Specifically, inversion techniques require the calculation of a cost function every time a new well is processed/logged with an electromagnetic imager tool. There therefore exist needs for systems and methods for more efficiently identifying values of mud and formation parameters from measurements made by electromagnetic imager tools. In particular, there exist needs for system and methods for quickly identifying values of mud and formation parameters from measurements made by electromagnetic imager tools at reduced computational costs.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
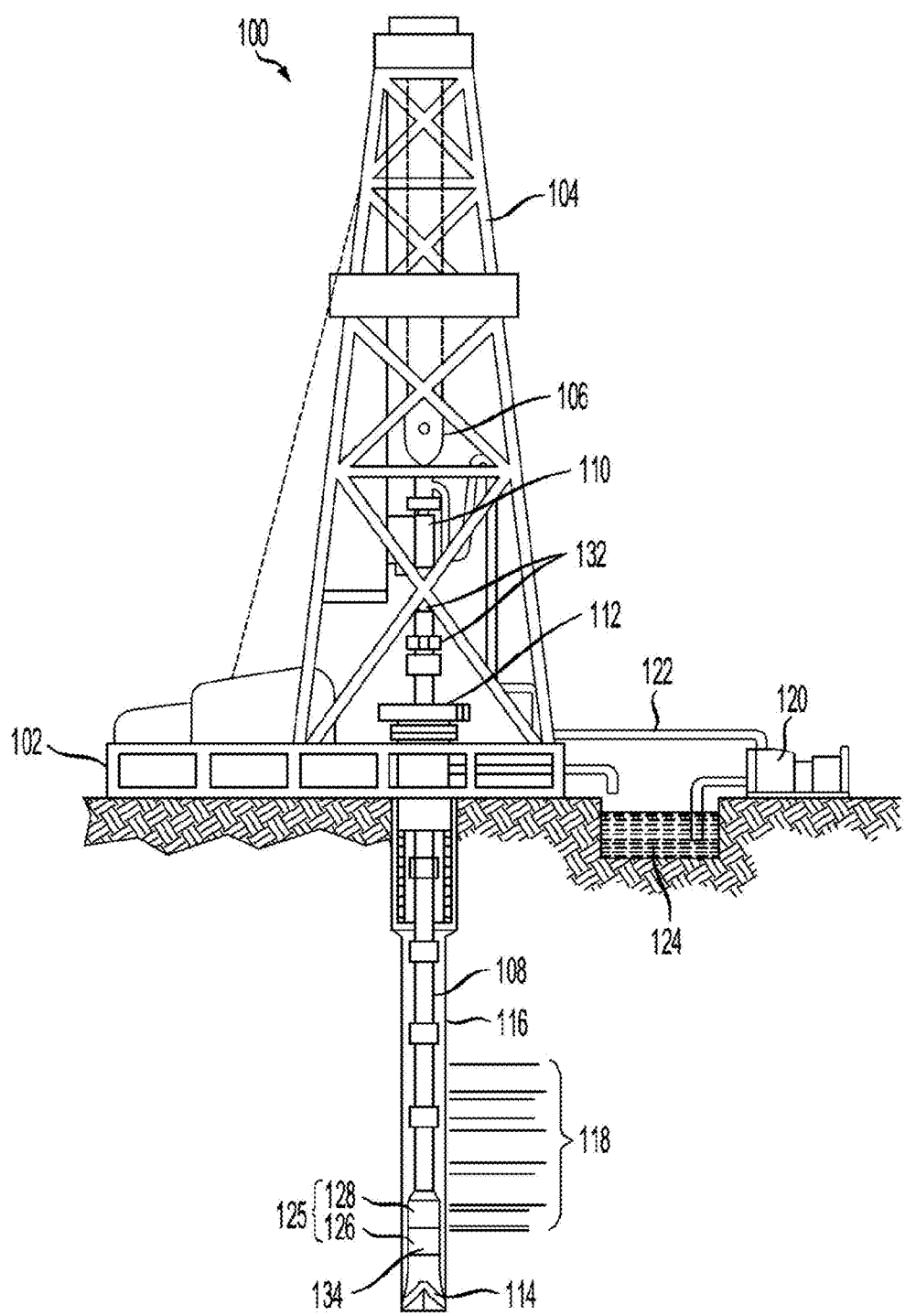
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The disclosed technology addresses the foregoing by using machine learning to identify values of mud and formation parameters from measurements gathered by an electromagnetic imager tool. Specifically, regression functions can be generated through machine learning using a known dataset associated with an electromagnetic imager tool. In turn, one or more values of mud and formation parameters can be identified by applying the regression functions to measurements made by the electromagnetic imager tool.

In various embodiments, one or more regression functions that model mud and formation parameters capable of being identified through an electromagnetic imager tool as a function of possible tool measurements of the electromagnetic imager tool can be generated using a known dataset associated with the electromagnetic imager tool. One or more tool measurements obtained by the electromagnetic imager tool operating to log a wellbore can be gathered. As follows, one or more values of the mud and formation parameters can be identified by applying the one or more regression functions to the one or more tool measurements.

In various embodiments, a system can include one or more processors and at least one computer-readable storage medium storing instructions which, when executed by the one or more processors, cause the one or more processors to generate one or more regression functions that model mud and formation parameters capable of being identified through an electromagnetic imager tool as a function of possible tool measurements of the electromagnetic imager tool. Specifically, the instructions can cause the one or more processors to generate the one or more regression functions using a known dataset associated with the electromagnetic imager tool. The instructions can also cause the one or more processors to gather one or more tool measurements obtained by the electromagnetic imager tool operating to log a wellbore. Further, the instructions can cause the one or more processors to identify one or more values of the mud and formation parameters by applying the one or more regression functions to the one or more tool measurements.

In various embodiments, a system can include a non-transitory computer-readable storage medium having stored therein instructions which, when executed by a processor, cause the processor to generate one or more regression functions that model mud and formation parameters capable of being identified through an electromagnetic imager tool as a function of possible tool measurements of the electromagnetic imager tool. Specifically, the instructions can cause the processor to generate the one or more regression functions using a known dataset associated with the electromagnetic imager tool. The instructions can also cause the processor to gather one or more tool measurements obtained by the electromagnetic imager tool operating to log a wellbore. Further, the instructions can cause the processor to identify one or more values of the mud and formation parameters by applying the one or more regression functions to the one or more tool measurements.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic imager tool as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drill pipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drill pipe.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
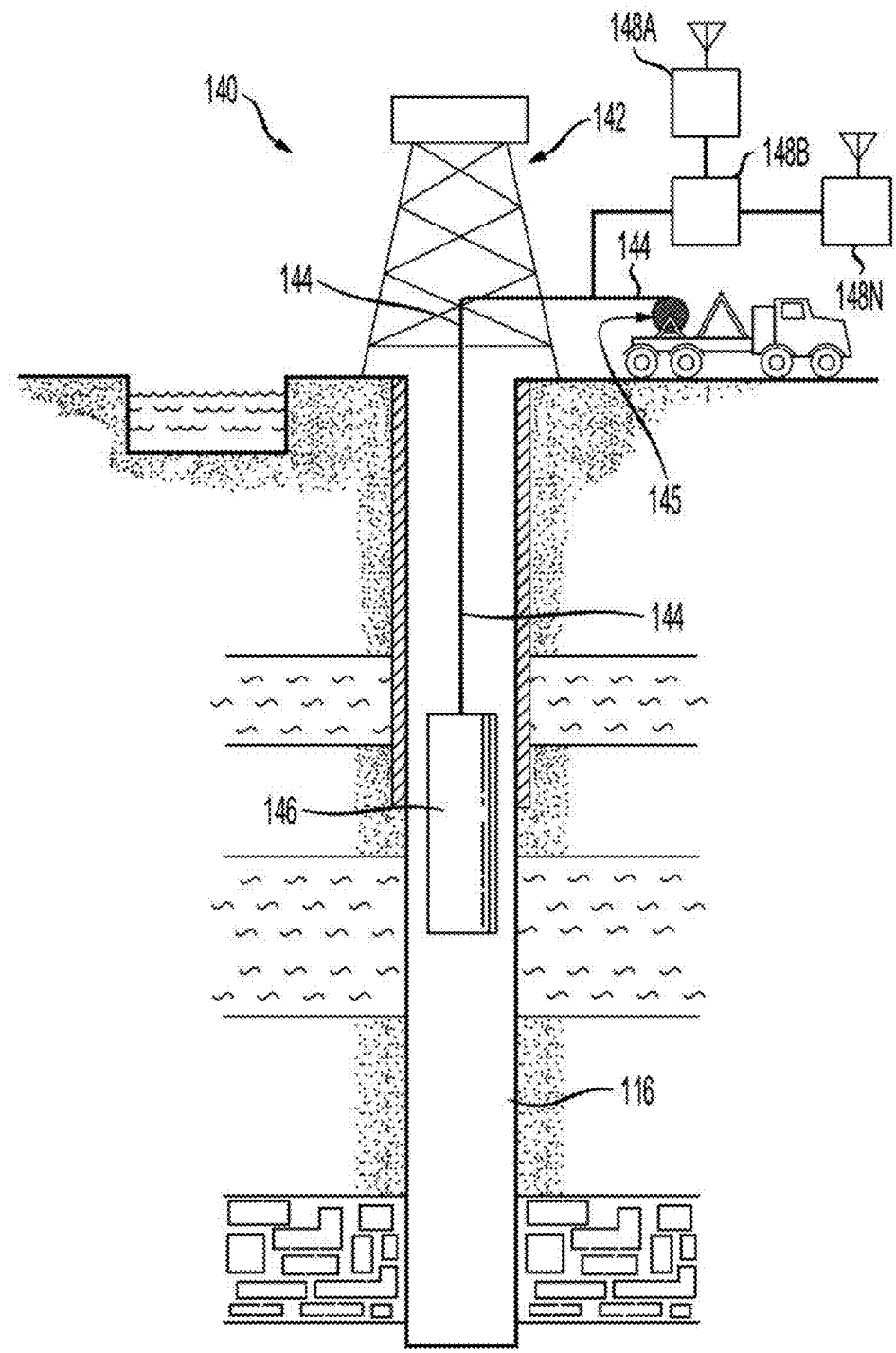
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. An electromagnetic imager tool can be operated in the example system 140 shown in FIG. 1B to log the wellbore. A downhole tool is shown having a tool body 146 in order to carry out logging and/or other operations. For example, instead of using the drill string 108 of FIG. 1A to lower tool body 146, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
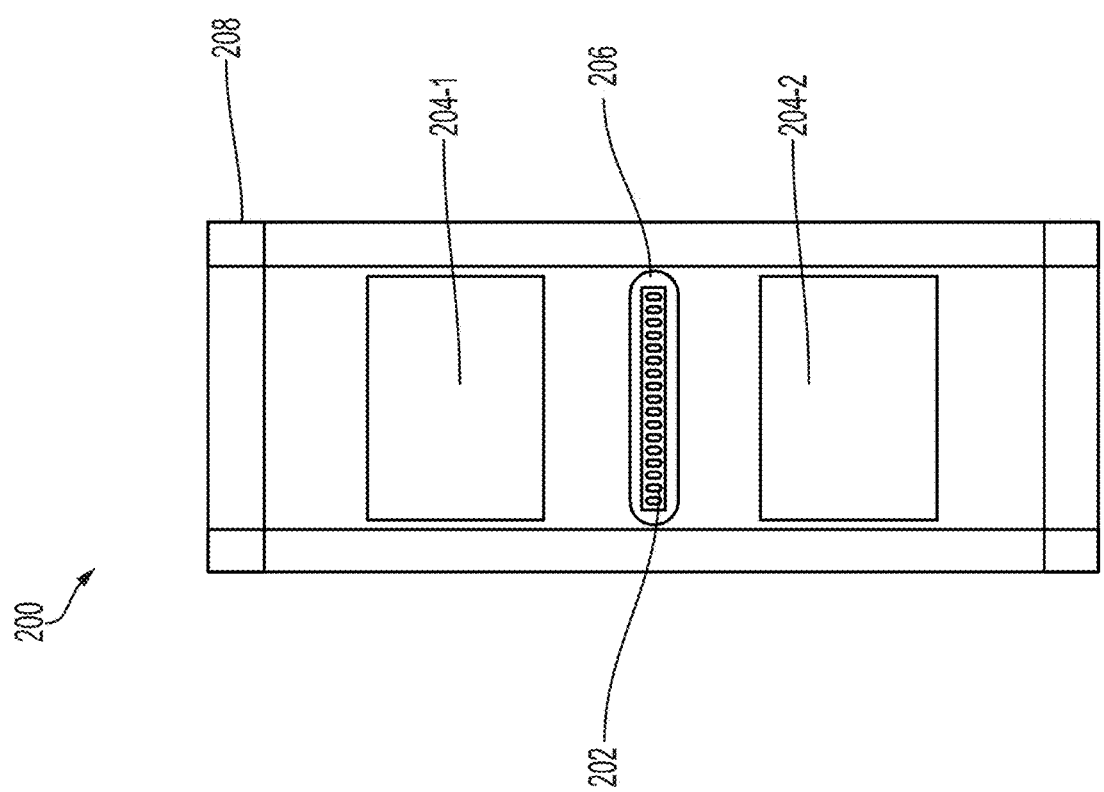
FIG. 2 illustrates a schematic diagram of an example pad of an electromagnetic imager tool, in accordance with various aspects of the subject technology.

FIG. 2 illustrates a schematic diagram of an example pad 200 of an electromagnetic imager tool, as described in FIGS. 1A-1B above. The electromagnetic imager tool functions to gather measurements during operation, e.g. while logging a wellbore, e.g. for purposes of imaging a formation surrounding the wellbore. Specifically, the electromagnetic imager tool can operate in a drilling mud to gather measurements for imaging the formation surrounding the wellbore. The electromagnetic imager tool can operate in an applicable type of drilling mud, such as an oil-based mud or a water-based mud, to log the wellbore. In operating to log the wellbore, the electromagnetic imager tool can gather applicable measurements that are capable of being measured by the electromagnetic imager tool. For example, measurements made by the electromagnetic imager tool can include apparent impedivity and/or impedance measurements at the electromagnetic imager tool, complex impedance measurements at the electromagnetic imager tool, voltage measurements at the electromagnetic imager tool, current measurements at the electromagnetic imager tool, phase measurements at the electromagnetic imager tool, and absolute values of impedance measurements at the electromagnetic imager tool.

The measurements gathered by the electromagnetic imager tool can be used to identify values of mud and formation parameters associated with the electromagnetic imager tool, e.g. parameters inside of and outside of the wellbore. Mud and formation parameters include applicable parameters that can be identified from measurements taken by the electromagnetic imager tool for purposes of imaging the wellbore. For example, mud and formation parameters can include mud permittivity, mud resistivity, standoff, formation permittivity, and formation resistivity. The values of the mud and formation parameters can be identified using the techniques described herein on a per-button basis. For example, formation resistivity, formation permittivity, mud resistivity, mud permittivity and standoff values can be identified for each button included as part of the button array 202 of the pad 200. In various embodiments, resistivity and permittivity values can be assumed to be frequency independent. Alternatively, resistivity and permittivity can be assumed to be frequency dependent and the resistivity value and permittivity value for each frequency can be solved independently using the techniques described herein.

In operating the electromagnetic imager tool to gather measurements for imaging, a voltage difference can be applied across the button array 202 and first and second return electrodes 204-1 and 204-2 (return electrodes 204) of the pad 200. This voltage difference can generate currents that pass from the button array 202 into the mud and a surrounding formation. The pad 200 also includes a guard electrode 206 around the button array 202. The same potential that is applied to the button array 202 can be applied to the guard electrode 206 to focus all or a substantial portion of the current emitted into the mud and the surrounding formation. Specifically, the current can be emitted substantially radially into the surrounding formation by applying the same potential on the guard electrode 206 and the button array 202. An applicable electrical and/or thermal insulating material, such as a ceramic, can fill the remaining portions of the pad 200. For example, a ceramic material can be disposed between the return electrodes 204 and the guard electrode 206.

The pad 200 is covered, at least in part, with a housing 208. The housing 208, and accordingly the pad 200 through the housing 208, can be connected through a securing mechanism to a mandrel. The securing mechanism can be a movable mechanism that moves the housing 208 and the contained pad 200 to substantially maintain contact with the formation. For example, the securing mechanism can include an arm that opens and/or swivels to move the housing 208 and the contained pad 200. By moving the housing 208 and the contained pad to maintain a good contact with the formation, the mud effect can be minimized. Alternatively, the housing 208, and as follows the pad 200, can be secured along an outer portion of a drill string. Specifically, the housing 208 and the pad 200 can be secured along an outer portion of a bottom hole assembly. In being secured along an outer portion of a drill string, the housing 208 and/or the pad 200 can be rigidly secured to the outer portion of the drill string. In turn, either or both the housing 208 and the pad 200 can move with the drill string, e.g. as the drill string moves during operation.

The mud effect refers to the contribution of the mud to the measured impedance. This effect is particularly severe if a formation exhibits low resistivity and the distance between the pad's outer surface and the borehole wall (i.e. the formation) is high. In those instances, measured impedance may have very low sensitivity to the formation features. Maintaining good contact between the pad 200 and the formation can help to ensure that the electromagnetic imager tool actually measures the formation and not just the mud when the formation has low resistivity. Since mud effect is a function of standoff, the term standoff effect may be used interchangeably with mud effect in what follows.

Figure 3:
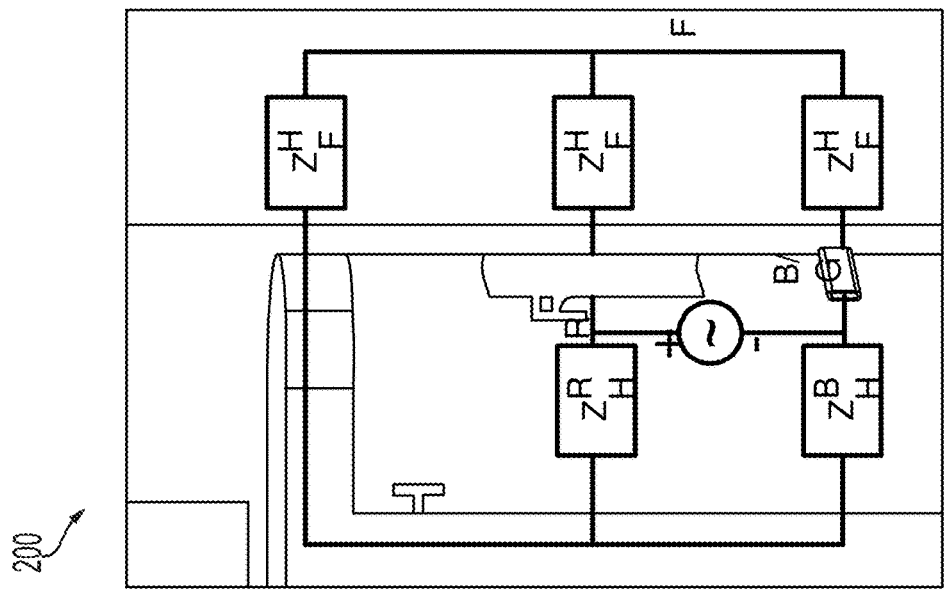
FIG. 3 illustrates a circuit model of the example pad illustrated in FIG. 2, in accordance with various aspects of the subject technology.

FIG. 3 illustrates a circuit model of the example pad 200 illustrated in FIG. 2. In the model, H denotes the housing (including the mandrel), F denotes the formation, either B or G denotes the button and guard assembly, and R denotes the return signal from the formation and/or the mud. While most of the transmitted current can be returned to the return electrodes, some portions of the transmitted current can return through the housing and/or the mandrel. An impedance value for each button can be calculated by measuring the voltage between the buttons and the return electrodes and dividing the measured voltage by the current transmitted through each button of the button array. Specifically, this technique is represented in Equation 1 shown below. In Equation 1, Z is the button impedance of one of the buttons in the button array, $V_{BR}$ is the button to return voltage, and $I_B$ is the button current.

$$Z = \frac{V_{BR}}{I_B} \quad \text{Equation 1}$$

A button impedance calculated, e.g. calculated by Equation 1, can be equal to the impedances of the button and guard assembly and the formation $Z_{BF}$ and the impedances of the return and the formation $Z_{RF}$, as shown in the circuit model in FIG. 3. While $Z_{BF}$ and $Z_{RF}$ are denoted with respect to the formation F, $Z_{BF}$ and $Z_{RF}$ can have contributions from both the mud and the formation. Thus, $Z_{BF}$ can equivalently be represented by Equation 2 shown below.

$$Z \approx Z_{BF} = Z_{mud} + Z_F \quad \text{Equation 2}$$

As a result, a measured button impedance, as shown in Equation 2, can have contributions from both the mud and the formation. If the imaginary parts of $Z_F$ and $Z_{mod}$ are mainly capacitive, and assuming this capacitance is in parallel with the resistive portion, $Z_{BF}$ can also be written as shown in Equation 3 below.

$$Z_{BF} = \frac{1}{\left(\frac{1}{R_M} + j\omega C_M\right)} + \frac{1}{\left(\frac{1}{R_F} + j\omega C_F\right)} \quad \text{Equation 3}$$

In Equation 3, R and C denote the resistance and capacitance and ω is the angular frequency (e.g. ω=2πf where f is the frequency in Hz). In Equation 3, subscript M denotes the mud while F denotes the formation. Both the mud resistance and mud capacitance can increase with standoff and decrease with the effective area of the buttons.

Equation 3 can provide just a basic approximation to the impedance measured by the electromagnetic imager tool. However, Equation 3 can be useful in illustrating the effects of mud and formation parameters on the measured impedance. Specifically, from Equation 3, it can be deduced that high frequencies are needed to reduce the mud contribution to the measured impedance. Equation 3 can also be used to obtain basic performance curves for the electromagnetic imager tool which are fairly accurate in homogeneous formations.

Figure 4:
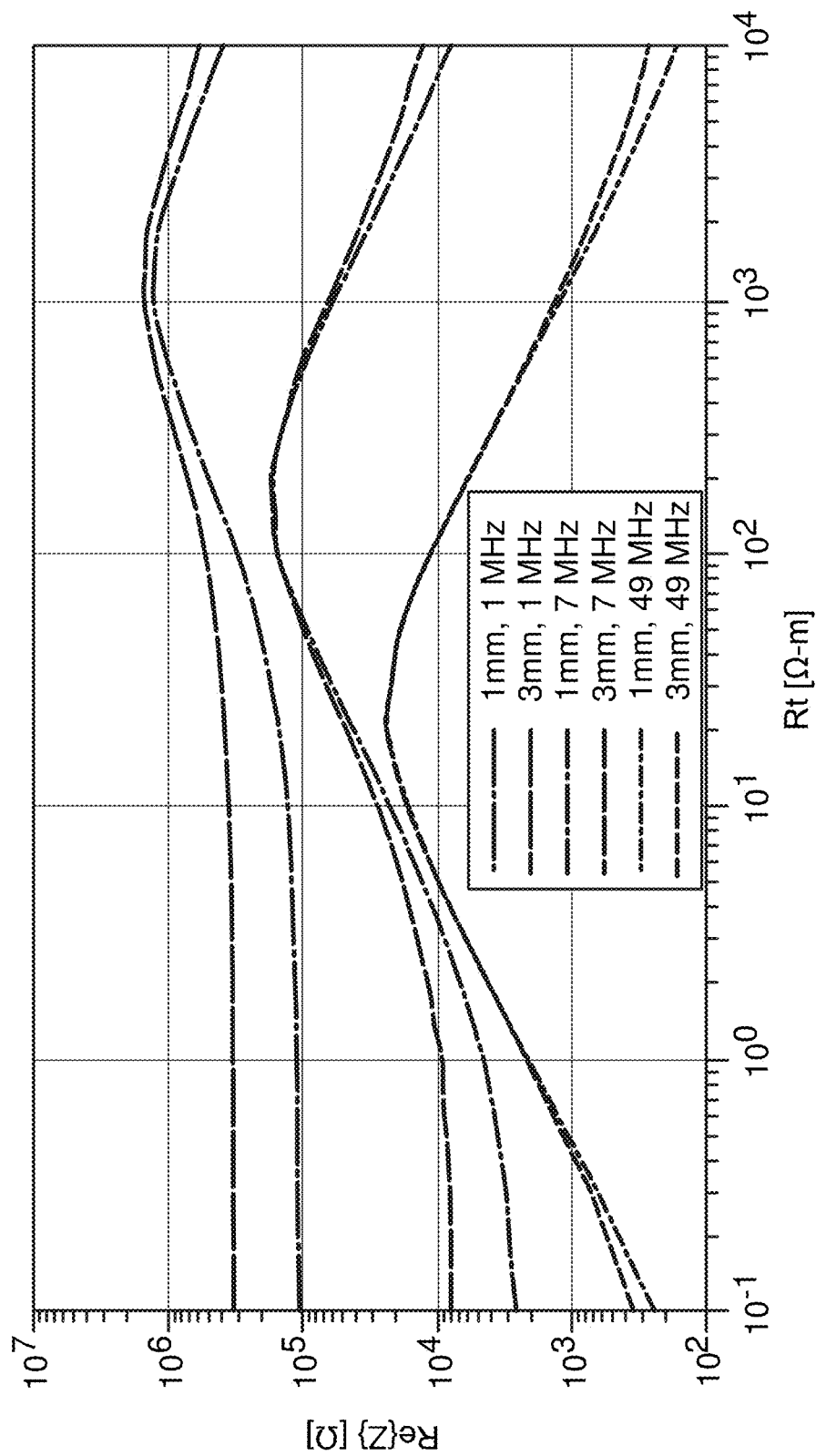
FIG. 4 is a plot of real parts of impedances measured by the electromagnetic imager tool versus formation resistivity $R_t$, in accordance with various aspects of the subject technology.

FIG. 4 is a plot of real parts of the impedances measured by the electromagnetic imager tool versus formation resistivity $R_r$. In the plot shown in FIG. 4, it is assumed that formation permittivity ($\varepsilon_F$) is 15, mud permittivity ($\varepsilon_M$) is 6 and mud resistivity ($\rho_M$) is 8000 Ω-m. Results for three different frequencies (1 MHz, 7 MHz and 49 MHz) at 2 different standoffs (1 mm and 3 mm) are shown.

Although the results shown in the diagram in FIG. 4 are generated based on a circuit theory approximation, it is not straightforward to interpret responses of the electromagnetic imager tool even with this simplified model. Specifically, tool response does not necessarily vary linearly with formation resistivity. Instead, tool response is a complicated function of formation and mud properties (resistivity and permittivity), as well as the standoff. The dominant effect on tool response at low formation resistivities and low frequencies can be the standoff effect. However, small variations in standoff can cause a large difference in the impedance reading if these raw measurements are used. For high formation resistivities and high frequencies, formation permittivity can have the most dominant effect on tool response, e.g. the measured impedance. This causes the apparent resistivity curve to decrease after a certain formation resistivity in what is known as dielectric roll-off. The resistivity where dielectric roll-off occurs is both formation and tool dependent.

It is apparent that identifying values of mud and formation parameters from tool measurements made by electromagnetic imager tools is extremely complex as the tool response is dependent on a number of different factors. As described previously, inversion based approaches have been developed to identify values of mud and formation parameters from tool measurements made by electromagnetic imager tools. Typical inversion techniques are model based approaches that rely on simulating the response of the tool using a forward model, e.g. a model obtained with 3D electromagnetic simulation software. Then, the parameters that minimize the difference between measurements and the modeled response corresponding to these parameters are returned as the inversion output. An iterative process, such as the Gauss-Newton method, can be used for this purpose. The modeled responses can be simulated beforehand within a grid in the expected parameter range. Then, each response for the desired parameters can be found via multidimensional interpolation if it does not lie on the grid.

$$\arg_{\overline{X}} \min \|\overline{\overline{I}} - \overline{\overline{I}}^M(\overline{X})\| \quad \text{Equation 4}$$

Equation 4, shown above, represents the inversion process. Specifically, a parameter set X, where overbar represents that parameter set may be a vector, that minimizes the difference between the measurements of the imager (denoted as $\overline{\overline{I}}$, where the double overbar is meant to represent that the measurements may be a matrix, and the modeled response ($\overline{\overline{I}}^M$) corresponding to a given parameter set. Double bars denote the normal operation, e g minimization is in the least squares sense, which is one of the possible implementations. The function that is minimized is called the cost function. A regularization term can be added to the cost function. This cost function is calculated every time new data is gathered using an electromagnetic imager tool. As described previously, this takes a large amount of time and also consumes a large amount of computational resources.

Figure 5:
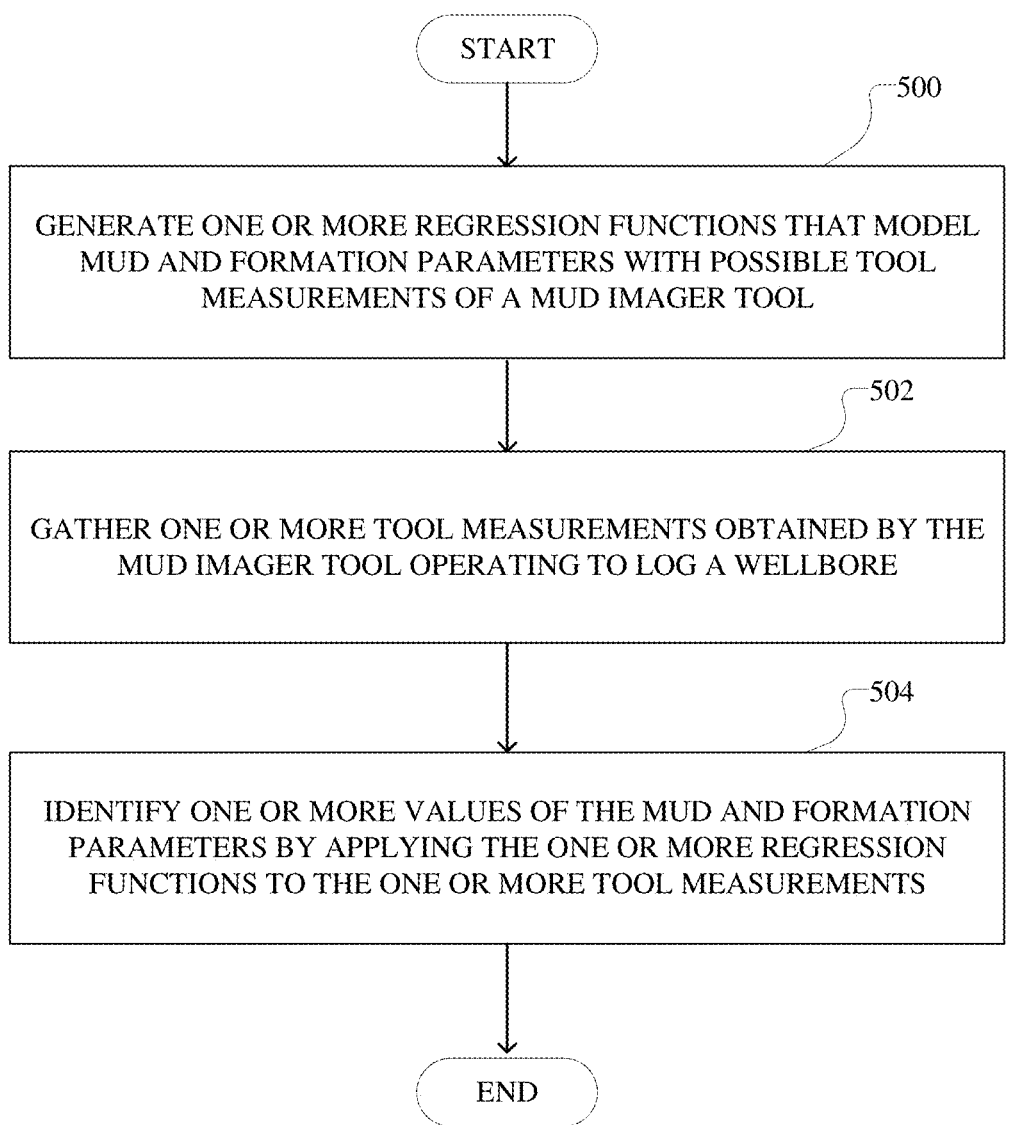
FIG. 5 illustrates a flowchart for an example method of identifying values of mud and formation parameters from measurements made by an electromagnetic imager tool through machine learning, in accordance with various aspects of the subject technology.

FIG. 5 illustrates a flowchart for an example method of identifying values of mud and formation parameters from measurements made by an electromagnetic imager tool through machine learning. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated. Each module shown in FIG. 5 represents one or more steps, processes, methods or routines in the method.

The example method shown in the flowchart of FIG. 5 can be used to overcome the previously described deficiencies of the inversion technique for identifying values of mud and formation parameters. Specifically and as will be discussed in greater detail later, a regression function can be determined using a training dataset in the machine learning based approach and whenever a new image log is obtained the regression function can be applied to identify values of formation and mud parameters. This is in contrast to the inversion technique which requires calculation of a new cost function every time a new dataset is obtained. This is advantageous, as it can save time while reducing computational costs needed to identify values of mud and formation parameters from measurements made by an electromagnetic imager tool. Another difference between the inversion technique and the method show in the flowchart of FIG. 5 is that actual measurements made by the electromagnetic imager tool serve as inputs in the machine learning approach and the outputs of the regression function are a combination of formation and mud parameters. This is in contrast to the inversion technique where formation and mud parameters actually serve as the inputs; that is inversion tries to find the formation and mud parameters whose response match the given actual measurements. This is advantageous as it again indicates the computational simplicity of the machine learning based approach once the regression function is obtained.

At step 500, one or more regression functions are generated that relate mud and formation parameters with possible tool measurement of an electromagnetic imager tool. The one or more regression functions can relate mud and formation parameters with possible tool measurements by modeling the mud and formation parameters as functions of possible tool measurements of the electromagnetic imager tool. As described previously, the mud and formation parameters include applicable parameters that can be identified from measurements taken by the electromagnetic imager tool for purposes of imaging, e.g. the wellbore. Although formation resistivity is typically the desired parameter to identify using the electromagnetic imager tool, other parameters may also be desirable. For example, determination of the dielectric constant over frequency can be used to find the formation cementation exponent in Archie's equation. In turn, this can be used to determine the water saturation of the formation. Further, knowledge of the standoff can help in determining whether fractures are closed or not.

The one or more regression functions can be generated using a known dataset associated with the electromagnetic imager tool. A known dataset associated with the electromagnetic imager tool can be a training, validation, and testing dataset that includes known inputs and known outputs corresponding to the known inputs. Specifically, a known dataset associated with the electromagnetic imager tool can include known measurements associated with the electromagnetic imager tool. As follows, the known dataset associated with the electromagnetic imager tool can also include known values of mud and formation parameters that are identifiable from the measurements associated with the electromagnetic imager tool. For example, a known dataset can include resistivity and permittivity measurements for the formation and mud as well as the standoff and corresponding impedance and/or impedivity measurements of the electromagnetic imager tool.

The known dataset associated with the electromagnetic imager tool can be simulated. Specifically, the known dataset can include simulated values of the tool measurements associated with the electromagnetic imager tool corresponding to a range of the formation and mud parameters. For example and as will be discussed in greater detail later with respect to an example of generating the one or more regression functions through an artificial neural network, the known dataset can be simulated using 3D electromagnetic simulation software.

Further, the known dataset associated with the electromagnetic imager tool can be created through previous usage/experimentation of the electromagnetic imager tool. Specifically, the known dataset can include measurements gathered through experimental or previous operation of the electromagnetic imager tool corresponding to values of the mud and formation parameters. For example, the known data set can be gathered during a previous imaging job in which the electromagnetic imager tool was utilized to log a wellbore. In another example, the known dataset can be generated by operating the electromagnetic imager tool in a controlled environment, such as a test tank where materials with known properties can be used to form an artificial mud and formation.

The tool measurements included in the known dataset, whether simulated or previously gathered tool measurements, can include applicable measurements that are actually capable of being made by the electromagnetic imager tool, such as the previously described tool measurements. For example, the tool measurements including in the known dataset can include impedance measured by a button. In including measurements on a per-button basis, the electronic and geometric variations between buttons can be ignored. The known dataset can also include characteristics of the measurements included in the known dataset. For example, the known dataset can include a frequency at which the tool measurements are taken.

Further, the tool measurements included in the known dataset, whether simulated or previously gathered tool measurements, can include auxiliary measurements that are capable of being taken by an auxiliary tool in a wellbore. An auxiliary tool can include an applicable tool that functions with the electromagnetic imager tool during an imaging operation. For example, auxiliary tools can include microspherical focused laterolog tools, induction tools, and high frequency dielectric tools. Auxiliary measurements include applicable measurements that are capable of being taken by an auxiliary tool. For example, auxiliary measurements can include caliper measurements of auxiliary tools, frequency measurements of auxiliary tools, and mud and formation resistivity measurements of auxiliary tools. The known dataset can also include characteristics of the auxiliary measurements included in the known dataset. For example, the known dataset can include a frequency at which the auxiliary measurements are taken.

The one or more regression functions can be generated using one or more machine learning models. Specifically, the one or more regression functions can be generated by training one or more machine learning models using the known dataset associated with the electromagnetic imager tool. While reference will be made through this paper to training the regression functions through an artificial neural network, the regression functions can be generated using an applicable machine learning model. For example, the one or more regression functions can be generated using one or a combination of an evolutionary model, a random forest regression model, and a support vector regression technique.

When evolutionary models are used to generate the one or more regression functions, a large number of candidate regression functions can be tested. These candidate functions can include applicable candidate functions such as polynomial, exponential, logarithmic and trigonometric expressions. Conditional statements and step functions can also be tested. Initial candidate solutions can be seeded randomly within the search space. At each iteration of the evolutionary model, which is called a generation in analogy with biology, properties of the candidate functions, such as the coefficients of the functions or combinations of individual terms that make up the functions are mutated or crossed over. Mutation can include creating a random variation of a property. Crossing over can include replacing a property of a function with another property or combining two or more functions while keeping some or all of the terms of each function. A subgroup of the candidate functions can be selected based on a cost function at the end of an iteration. A value of the cost function can determine the fitness of the function, again in analogy with the biological phenomenon. The final regression function can be selected when a predetermined fitness threshold is satisfied or a maximum number of iterations or function evaluations have been performed.

When random forest models are used to generate the one or more regression functions, regression models can be created using a random subset of the training, validation and testing dataset based on a decision tree approach. Then, these regression functions can be combined through averaging to create a final regression function for the dataset. Decision trees can have nodes for each one of the input variables. Branches of these trees can represent the possibility of an outcome, while the leaves of the trees can denote possible outputs. Layouts of the nodes can be based on how well each node can classify the target output.

Support vector regression techniques are a subclass of the support vector machine technique that can be used to find a regression function. Specifically, the support vector regression technique is based on minimizing a weight function whose inner product with the input (plus a DC offset) is an approximation of the output.

At step 502, one or more tool measurements of the electromagnetic imager tool are gathered. The measurements include measurements made by the electromagnetic imager tool in operating to log a wellbore. The measurements can include applicable measurements capable of being made by the electromagnetic imager tool, such as the previously described tool measurements.

Measurements can be gathered on a per-button basis from one or an applicable combination of buttons included as part the electromagnetic imager tool. Specifically, measurements can be gathered from all the buttons of a pad of the electromagnetic imager tool or all buttons from all pads of the electromagnetic imager tool. In the scenarios where the measurements are gathered from all buttons on a pad or all buttons on all pads of the electromagnetic imager tool, the measurements can be more accurate and take into account intrinsic variations between the buttons. Specifically, the values of the mud and formation parameters can include mud resistivity and mud permittivity, which can be constant for all the buttons, as well as formation resistivity, formation permittivity and standoff for each button. Alternatively measurements can be gathered for buttons within a specific depth window. This can allow for the identification of values of the mud and formation parameters that relate to the layering of the formation and may more accurately handle shoulder bed type of effects.

At step 504, one or more values of the mud and formation parameters that are capable of being identified through operation of the electromagnetic imager tool are actually identified. Specifically, the values of the mud and formation parameters are identified, at step 504, by applying the one or more regression functions to the one or more tool measurements of the electromagnetic imager tool that are gathered at step 502. The values of the mud and formation parameters identified at step 504 include applicable parameters that can be identified from measurements taken by the electromagnetic imager tool for purposes of imaging, such as the previously described mud and formation parameters.

The tool measurements gathered at step 502 can be preconditioned before the regression functions are applied at step 504. Preconditioning the tool measurements can lead to improved accuracy in identifying values of the mud and formation parameters.

Preconditioning can include calibrating the tool measurements to the known dataset that is used to generate the regression functions. This can help to ensure that the tool measurements are consistent with the known dataset. Calibration of the tool measurements can be temperature dependent to correct for electronic offsets introduced by a changing temperature downhole. Specifically, temperatures may be logged by a temperature sensor downhole. In turn, the logged temperature measurements can be used to calibrate the tool measurements with the known dataset.

Additionally, preconditioning the tool measurements can include processing the tool measurements to improve the quality of the measurements. For example, the measurements can be filtered to reduce noise and eliminate outliers. The benefits of this approach can be fully realized in a sequential implementation, as will be discussed in greater detail later, for solving slowly varying mud and formation parameters. Specifically, tool measurements for determining mud properties can be filtered, while measurements for determining higher resolution mud and formation parameters, e.g. through the sequential implementation, can be left unfiltered.

Preconditioning the tool measurements can also include flattening the tool measurements. Specifically, the tool measurements can be flattened if the measurements are obtained from multiple buttons at the same depth. More specifically, the tool measurements can be flattened if the measurements are obtained from multiple buttons at the same depth and the measurements are used to solve for the same mud and formation parameter. Measurement flattening can also be applied to the known dataset associated with the electromagnetic imager tool that is used to generate the one or more regression functions at step 500. Specifically, if the known dataset is obtained from measurements made in a real well, then the known dataset can be flattened.

Figure 6:
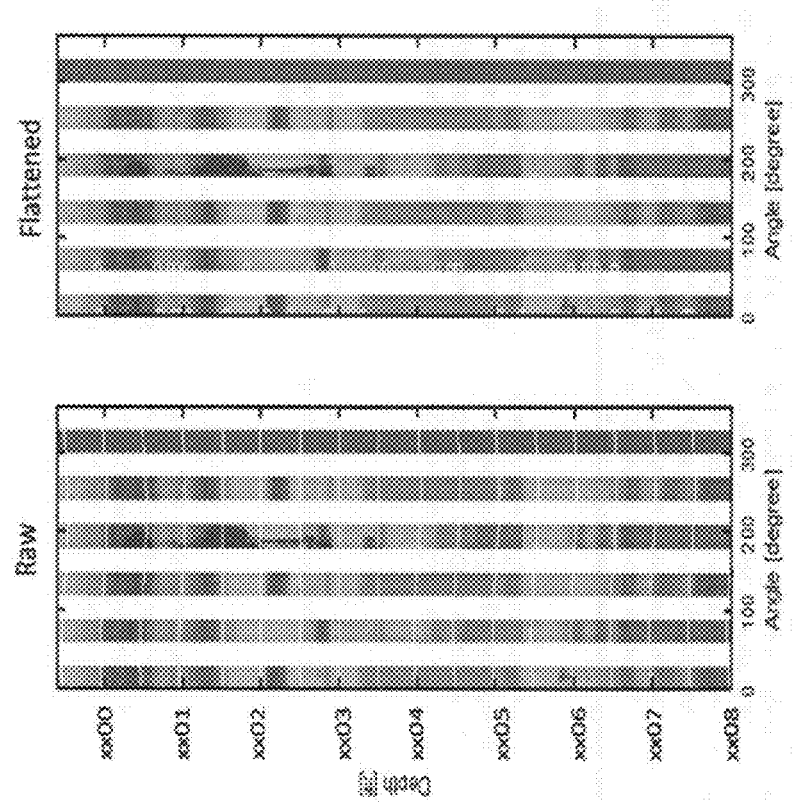
FIG. 6 illustrates the results of measurements flattening, in accordance with various aspects of the subject technology.

Measurement flattening can include determining a dip of a formation and applying a conformal mapping such that the variation of formation features associated with the dip is eliminated FIG. 6 illustrates example results of measurements flattening. The substantially horizontal white lines in the representation of the raw data depict the identified dips overlaid on the raw data. As shown in the representation of the flattened data, the formation features associated with the dips are substantially eliminated.

In various embodiments, the identified values of the mud and formation parameters can be constrained. The values of the mud and formation parameters can be constrained by assigning a cutoff value to the mud and formation parameters. For example, formation resistivity can be constrained between a predicted lower range of 0.010 Ωm and a predicted upper range of 100000 Ωm. Further, constraining the values of the mud and formation parameters can also include filtering the output values for slowly varying parameters. This can reduce an amount of noise present in the identified values of the mud and formation parameters. In the sequential implementation, as will be discussed in greater detail later, the values of a mud and formation parameter can be constrained before they are applied to determine values of other mud and formation parameters.

In various embodiments, the regression functions are selected from a plurality of regression functions before they are applied at step 504. The regression functions can be selected to ensure that an appropriate regression function is applied in identifying values of specific mud and formation parameters. In turn, this can improve accuracy in identifying the values of the specific mud and formation parameters. A decision tree technique can be used to select a regression function from a plurality of regression functions. For example, it is difficult to identify mud properties when the electromagnetic imager tool is operating in formations with high resistivity. Accordingly, a regression function configured to identify just formation parameters can be used instead of a regression function that is configured to identify both mud and formation parameters. The regression function for identifying just formation parameters can be selected through a decision tree that is based on an absolute value of a received signal of the electromagnetic imager tool. This received signal can monotonically increase with an increase in formation resistivity while other mud and formation parameters remain constant.

Figure 7:
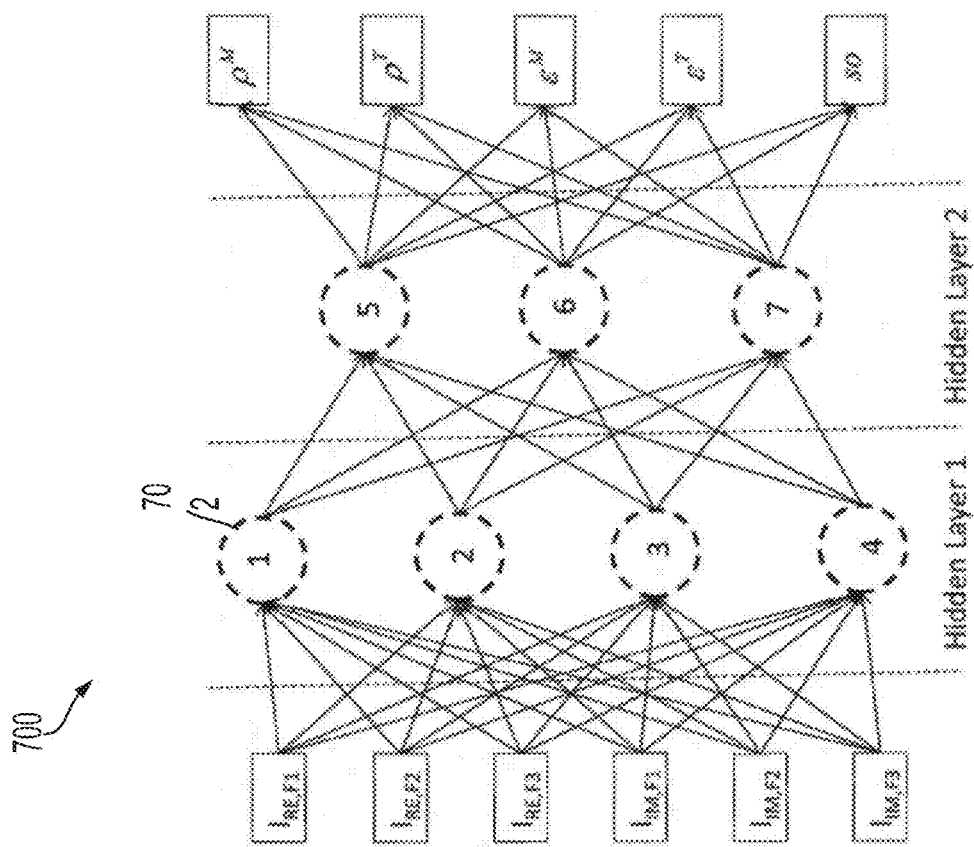
FIG. 7 illustrates an example neural network configuration for generating the one or more regression functions, in accordance with various aspects of the subject technology.

The discussion now continues with a description of an example of applying an artificial neural network to generate regression functions for identifying values of the mud and formation parameters. FIG. 7 illustrates an example neural network configuration 700 for generating the one or more regression functions. The example neural network configuration 700 can be used to generate one or more regression functions for identifying values of mud and formation parameters according to the techniques described herein.

A regression function, e.g. as generated using the example neural network configuration 700, can provide an optimal relationship between input and output. Specifically, the regression functions can provide an optimal relationship between tool measurements capable of being gathered by the electromagnetic imager tool and values of mud and formation parameters. Optimization can be based on minimizing a cost function, similar to the traditional inversion based approaches. Similar to how biological neurons operate, it is assumed that information between inputs and outputs is passed through connections (edges) in an artificial neural network. In most neural network solutions, additional internal (hidden) nodes can be introduced to increase the number of connections and improve the accuracy of a solution. These nodes can be interconnected to inputs and outputs as well as to each other. In some neural networks, there can be multiple layers of hidden nodes. For example, if there are two hidden layers, connections can be formed between the inputs and the nodes of the first hidden layer. Nodes in the first hidden layer can also be connected to nodes in the second hidden layer. Finally, nodes in the second hidden layer can be connected to output nodes. As a result, inputs and outputs are not directly connected but are instead connected through the nodes of the hidden layers. The number of nodes and hidden layers in a neural network are referred to as hyperparameters of the neural network.

With respect to the example neural network configuration 700 shown in FIG. 7, the inputs are real and imaginary parts of impedance and/or impedivity measurements at buttons in the electromagnetic imager tool. The impedance and/or impedivity measurements can be obtained for each of the operating frequencies of the electromagnetic imager tool. In this example, intrinsic differences between the buttons can be ignored. Further in the example, it can be assumed that the electromagnetic imager tool operates at three distinct frequencies, F1, F2, and F3. The outputs in the example neural network are mud resistivity ($\rho^M$), mud permittivity ($\varepsilon^M$), formation resistivity ($\rho^T$), formation permittivity ($E^T$) and standoff (so). For clarity in illustrating the example neural network shown in FIG. 7, it is assumed that these output parameters are not dependent on frequency. For example, if the formation permittivity is assumed to be frequency dependent, the single ($E^T$) output can be replaced with three additional outputs $\varepsilon_{F1}^T$, $\varepsilon_{F2}^T$, and $\varepsilon_{F3}^T$.

In the example neural network configuration 700 shown in FIG. 7, there are two hidden layers. The first hidden layer has four nodes while the second hidden layer has three nodes. Each connection can have a certain weight. These weights can define the value of a specific node with respect to the values of other nodes with outgoing connections to the specific node. For example, node 702 has incoming connections from all the input nodes. As a result, the value of node 702 can be expressed according to Equation 5, which is shown below.

$$N1 = f(w_1 \times I_{RE,F1} + w_2 \times I_{RE,F2} + w_3 \times I_{RE,F3} + w_4 \times I_{IM,F1} + w_5 \times I_{IM,F2} + w_6 \times I_{IM,F3})$$

Equation 5

In Equation 5, f denotes a specified function, $w_i$ is the weight between the connection of node 702 and input $I_{RE,F1}$, $w_2$ is the weight between the connection of node 702 and input $I_{RE,F2}$, $w_3$ is the weight between the connection of node 702 and input $I_{RE,F3}$, $w_4$ is the weight between the connection of node 702 and input $I_{IM,F1}$, $w_5$ is the weight between the connection of node 702 and input $I_{IM,F2}$, and $w_6$ is the weight between the connection of node 702 and input $I_{IM,F3}$. As an example, f may be the sigmoid function with a definition given by Equation 6, which is shown below.

$$\sigma(x) = \frac{1}{1 + e^{-x}}$$

Equation 6

Although not depicted in this example, an additional bias node can be added to each layer (other than the output layer) to provide a DC offset to the values. Bias nodes, as used herein, do not have incoming connections and only provide outgoing connections to the subsequent layer. By convention, bias nodes have a value of 1.

In order to identify the regression function using a neural network, e.g. the artificial neural network 700, the weights of the connections can be varied until a suitable, or otherwise optimized, regression function is generated. The known dataset associated with the electromagnetic imager tool can be used to vary the weights of the connections. The known dataset can be produced on a grid of $\rho^M$, $\varepsilon^M$, $\rho^T$, $\varepsilon^T$, and standoff (so). For example, all of the combinations of 50 logarithmically spaced values of $\rho^M$ between 5000 Ω-m and 500000 Ω-m, 10 linearly spaced values of $\varepsilon^M$ between 1 and 20, 20 linearly spaced values of $\varepsilon^T$ between 1 and 79, 50 logarithmically spaced values of $\rho^T$ between 0.01 Ω-m and 100000 Ω-m, and 10 linearly spaced values of so between 0.5 mm and 5 mm can be simulated for each of the three operating frequencies and the corresponding tool measurements in the known dataset can be found. The limits of the parameters in this illustrative example are meant to cover the whole operational range of the electromagnetic imager tool, while the grid spacing is defined fine enough to cover all the variations in tool response. The described values are merely provided as an example and in various embodiments, the used values can be fine enough to accurately characterize the performance of the electromagnetic imager tool. Returning to the example, five million samples (fifteen million simulations for three frequencies) are created. A large portion of these samples, e.g. 80%, or four million, can be used in training, while the rest can be used in validation and testing, as will be described in greater detail later.

The cost function for the neural network 700 can be represented by Equation 7, which is shown below.

$$\arg\min_{\vec{x}} \Sigma_{i=1}^{N} \|\overline{X}_i^T - (\overline{T}, \overline{W})\|$$
Equation 7

In Equation 7, the parameter set for each sample of the known dataset is denoted as $\overline{X}_i^T$, where i changes from 1 to N and N is four million for the example $\overline{X}^N(\overline{T}^i, \overline{W})$ represents the output of the neural network for the $i^{th}$ training set with training measurements of $\overline{T}^i$. $\overline{W}$ is the weight of the connections of the neural network over which the cost function is minimized. The cost function can be the mean square error between the prediction of the neural network and the known dataset. Additionally, other forms of error definitions can be used and additional regularization terms can be added to the cost function.

Once the neural network 700 is generated using the training dataset, a validation dataset can be used to validate the accuracy of the neural network 700 in predicting results. The validation dataset can be different from the training dataset. For example, the validation dataset can include samples from the one million samples that were not used in generating the neural network 700. This can prevent overfitting; e.g. the creation of a neural network that is optimized for a known dataset but cannot predict data outside of the known dataset well. For validation, the value of a cost function, e.g. as shown in Equation 7, can again be computed on the validation dataset. If the error is high, neural network parameters for the neural network 700 can be modified, e.g. to prevent overfitting. Finally, the resultant neural network 700 can be tested on another dataset, also referred to as the testing dataset to classify the final error. The testing dataset can be different from both the validation dataset and the training dataset. The primary purpose of the testing dataset is cross-validation. In cross-validation, datasets are divided into random training, validation and testing parts and the neural network 700 that has the least amount of testing error can ultimately be selected and applied.

The discussion now continues with a description of identifying values of specific groups of mud and formation parameters. Further, the discussion continues with a description of sequentially applying regression functions to sequentially determine values of mud and formation parameters, e.g. mud and formation parameters associated with different output groups.

Figure 8:
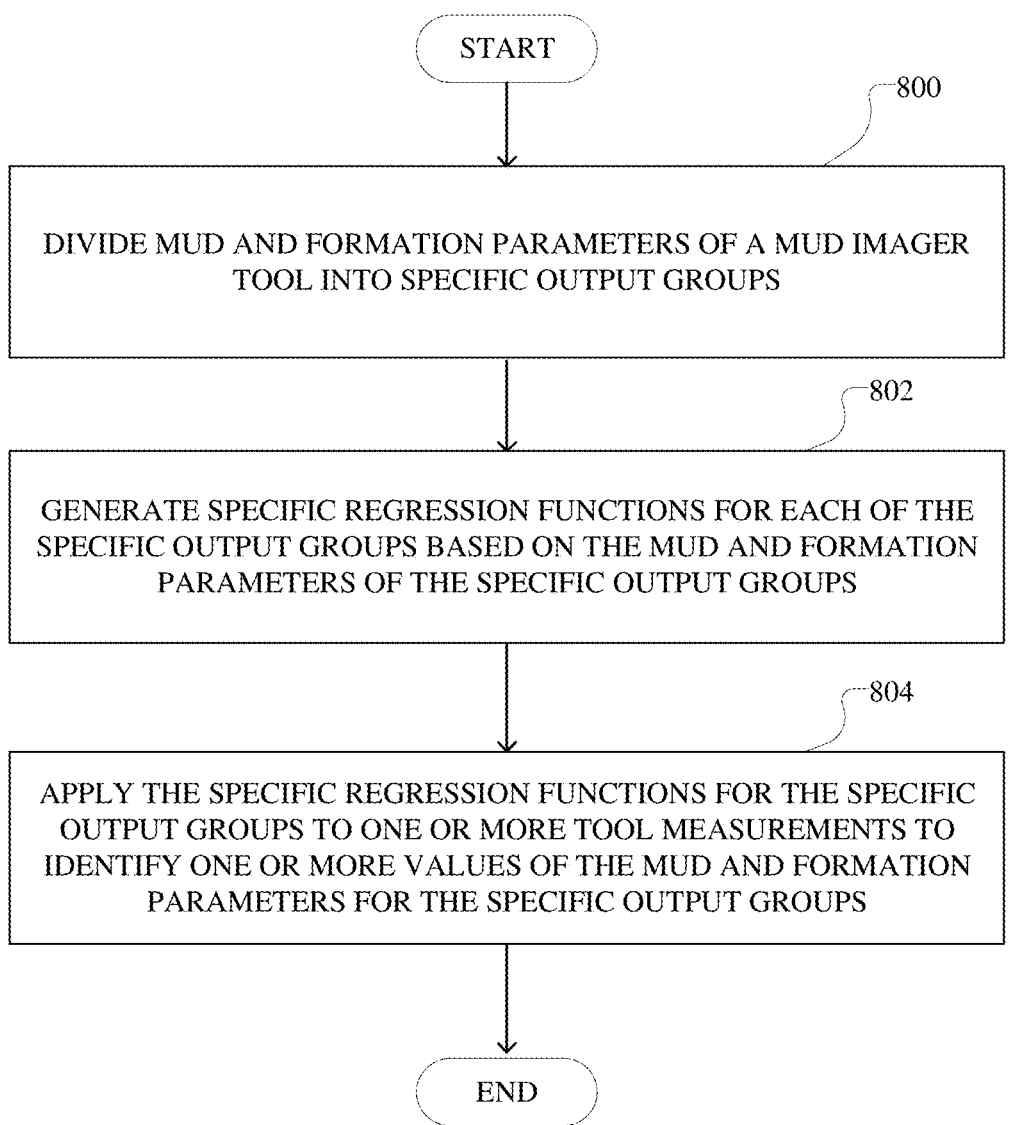
FIG. 8 illustrates a flowchart for an example method of separately identifying values of mud and formation parameters that are segmented into different output groups, in accordance with various aspects of the subject technology.

FIG. 8 illustrates a flowchart for an example method of separately identifying values of mud and formation parameters that are segmented into different output groups. The method shown in FIG. 8 is provided by way of example, as there are a variety of ways to carry out the method. Additionally, while the example method is illustrated with a particular order of steps, those of ordinary skill in the art will appreciate that FIG. 8 and the modules shown therein can be executed in any order and can include fewer or more modules than illustrated. Each module shown in FIG. 8 represents one or more steps, processes, methods or routines in the method.

At step 800, the mud and formation parameters capable of being determined through the electromagnetic imager tool are divided into specific output groups. The output groups can include one or more specific mud and formation parameters that are divided into or otherwise associated with the output groups. For example, a first output group can include mud resistivity and a second output group can include mud permittivity. By associating the one or more specific mud and formation parameters with the output groups, generated values of the mud and formation parameters can be grouped into the output groups based on the mud and formation parameters associated with the output groups. For example, if mud resistivity is associated with a first output group, then values of mud resistivity, as determined through application of regression functions, can be added to the first output group. Further in the example, if mud permittivity is associated with a second output group but not the first output group, then values of mud permittivity, as determined through application of regression functions can be added to the second output group and not the first output group.

At step 802, specific regression functions for each of the specific output groups are generated based on the mud and formation parameters associated with the specific output groups. For example, a regression function for identifying mud resistivity can be generated for a first output group if the mud resistivity parameter is included in the first output group. Further, a regression function for identifying mud permittivity can be generated for a second output group if the mud permittivity parameter is included in the second output group. The regression functions can be generated using an applicable machine learning technique, such as the machine learning techniques described herein.

By dividing the mud and formation parameters into different groups, different regression functions can be generated for each of the specific output groups. In particular, inputs, e.g. subsets of the known dataset, suitable for identifying the mud and formation parameters associated with the different groups can be selected for each of the groups. In turn, the inputs can be used to generate regression functions that are specific to mud and formation parameters of the different groups. For example, if a first group includes mud permittivity, then specific input for identifying mud permittivity can be selected and used to generate a regression function for the first group.

Using subsets of the known dataset to identify values of specific mud and formation parameters can conserve computational resources. Specifically, this can reduce the number of nodes used in training a regression function for identifying values of specific mud and formation parameters. Further, this can allow for the exclusion of inputs that do not affect the values of specific mud and formation parameters. In particular, for frequency dependent parameters, only the measurements for a specific frequency can be used. For example, dielectric roll-off (i.e. the effect of formation permittivity) can only occur for high frequencies. As a result, a dataset with fine sampling does not have to be built for cases where the formation resistivity is low for formation permittivity.

The subsets of the known dataset can be identified based on sensitivity of the parameters to data included in the known dataset. Sensitivity of the parameters can be found by calculating the partial derivative of tool measurements with respect to the parameter while keeping the other parameters constant. This sensitivity is shown below in Equation 8.

$$S(x) = \left\| \frac{\partial \bar{I}}{\partial x} \right\| \quad \text{Equation 8}$$

S(x) denotes sensitivity to a parameter x. If the rate of change is low, measurements are not sensitive to that parameter.

In various embodiments, a single regression function can be generated for a plurality of different mud and formation parameters. For example, a single regression function can be generated for identifying both mud permittivity and mud resistivity. In this instance, we refer by the single regression function as a single trained neural network with known weights. The different mud and formation parameters can span different output groups and the single regression function can be applied to identify values of the different mud and formation parameters across the different output groups.

At step 804, the specific regression functions for the specific output groups are applied to tool measurements gathered by the electromagnetic imager tool to generate output for the specific output groups. In particular, the regression functions can be applied to the tool measurements to identify values of mud and formation parameters associated with the output groups. For example, if mud resistivity is associated with a first output group, then one or more regression functions for the first output group can be applied to identify values of mud resistivity for the first output group. Further in the example, if mud permittivity is associated with a second output group, then one or more regression functions for the second output group can be applied to identify values of mud permittivity for the second output group.

Values of the mud and formation parameters can be determined sequentially through the application of one or more regression functions. For example, values of mud resistivity can be determined first and values of mud permittivity can be determined after the values of mud resistivity are determined. The same regression function can be applied to sequentially determine different values of mud and formation parameters. For example, a regression function can be applied to first identify mud resistivity and the regression function can be reapplied to identify mud permittivity. Alternatively, different regression functions can be applied to sequentially determine different values of mud and formation parameters. For example, a first regression function can be applied to first identify mud resistivity and a second regression function can then be applied to sequentially identify mud permittivity.

Identified values of the mud and formation parameters can serve as input for sequentially identifying values of other mud and formation parameters. Specifically, identified values of a mud and formation parameter can serve as input, along with actual tool measurements, to a regression function for identifying values of another mud and formation parameter. For example, identified values of mud permittivity can be fed into a regression function along with actual tool measurements to identify values of standoff. This can improve accuracy as relationships between different outputs can be accounted for in identifying values of different mud and formation parameters that are potentially related.

An example of applying a sequential technique for identifying formation and mud parameters will now be described. In the example, three output groups are created corresponding to mud permittivity and mud resistivity, standoff, and formation permittivity and formation resistivity.

Figure 9:
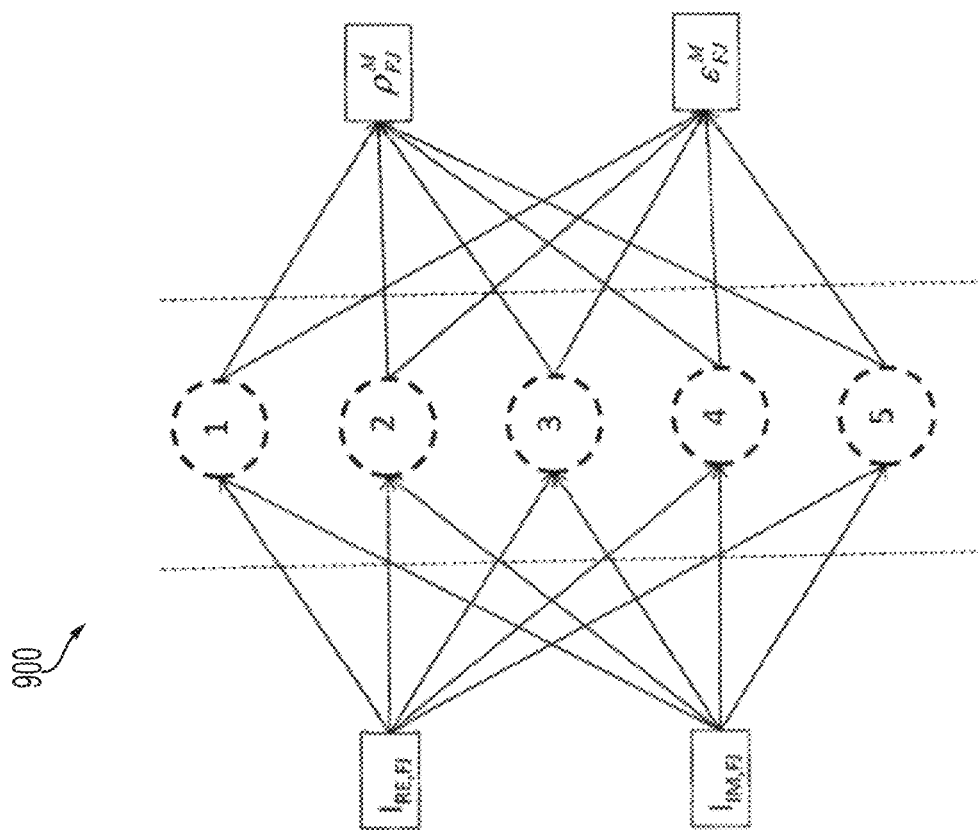
FIG. 9 illustrates an example neural network for generating one or more regression functions to identify values of mud resistivity and mud permittivity, in accordance with various aspects of the subject technology.

FIG. 9 illustrates an example neural network 900 for generating one or more regression functions to identify values of mud resistivity and mud permittivity. The number of nodes and hidden layers in the neural network 900 can be implementation dependent and these hyperparameters may be determined using a cross-validation approach. The example neural network 900 shown in FIG. 9 includes a single hidden layer. Four nodes are shown for illustrative purposes, however the actual number of nodes can be much larger. Since the mud permittivity and mud resistivity varies slowly, a window based approach can be used to determine mud permittivity and resistivity. In a window based approach, a large number of samples within a window can be used for a training set. Further in the window based approach, a simpler model can be trained. Then the regression function can be trained through the simpler model and subsequently applied to the large number of samples. The results obtained through the window based approach can be averaged over the window to increase accuracy. In the example neural network 900, the training unit is the real and imaginary data for a single button at a single frequency J that varies from one to three. Intrinsic variations between the buttons can be neglected and only a single data point can be used in obtaining the mud permittivity and mud resistivity for that frequency.

Figure 10:
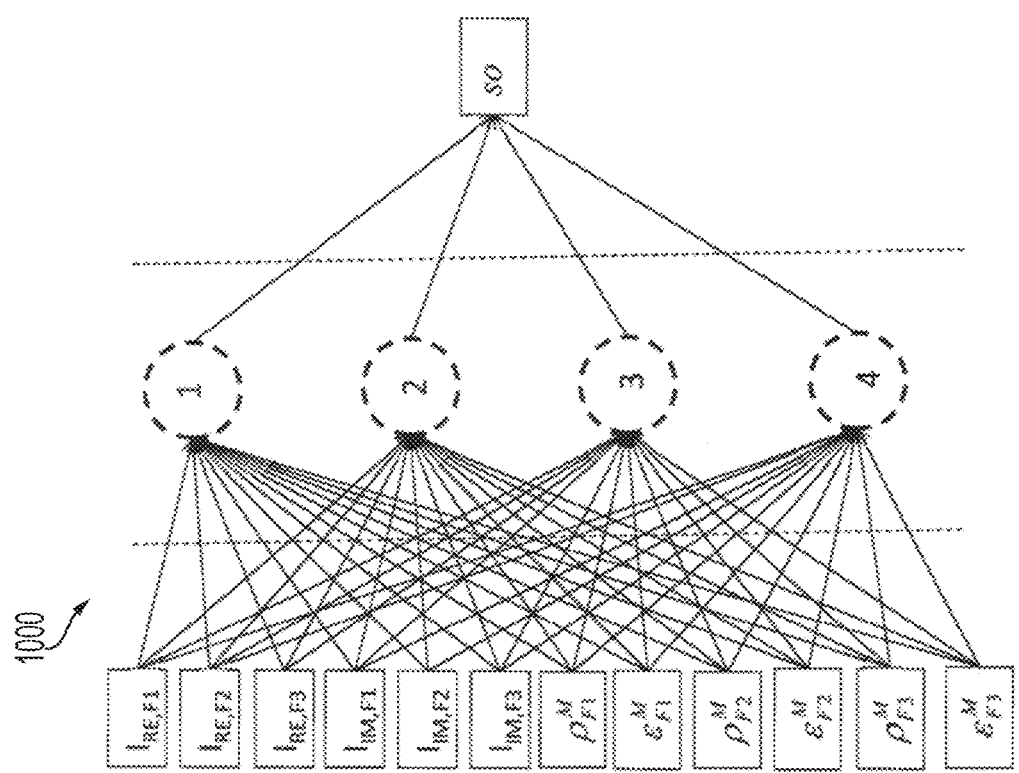
FIG. 10 illustrates an example neural network for generating one or more regression functions to identify values of standoff, in accordance with various aspects of the subject technology.

Standoff is identified next in the example sequential technique. FIG. 10 illustrates an example neural network 1000 for generating one or more regression functions to identify values of standoff. The neural network 1000 can be created by assuming no intrinsic variations between buttons, however, this approach can be extended to a different neural network for each button or a neural network that consists of a grouping of buttons such as all the buttons on the tool, all the buttons on a pad, half the buttons on a pad assuming a symmetric response, etc. In the neural network 1000 shown in FIG. 10, identified values of mud resistivity and mud permittivity, as determined in the previous step in the sequential technique, are used as inputs. Alternatively, the neural network 1000 can be generated without the identified values of mud resistivity and mud permittivity.

Figure 11:
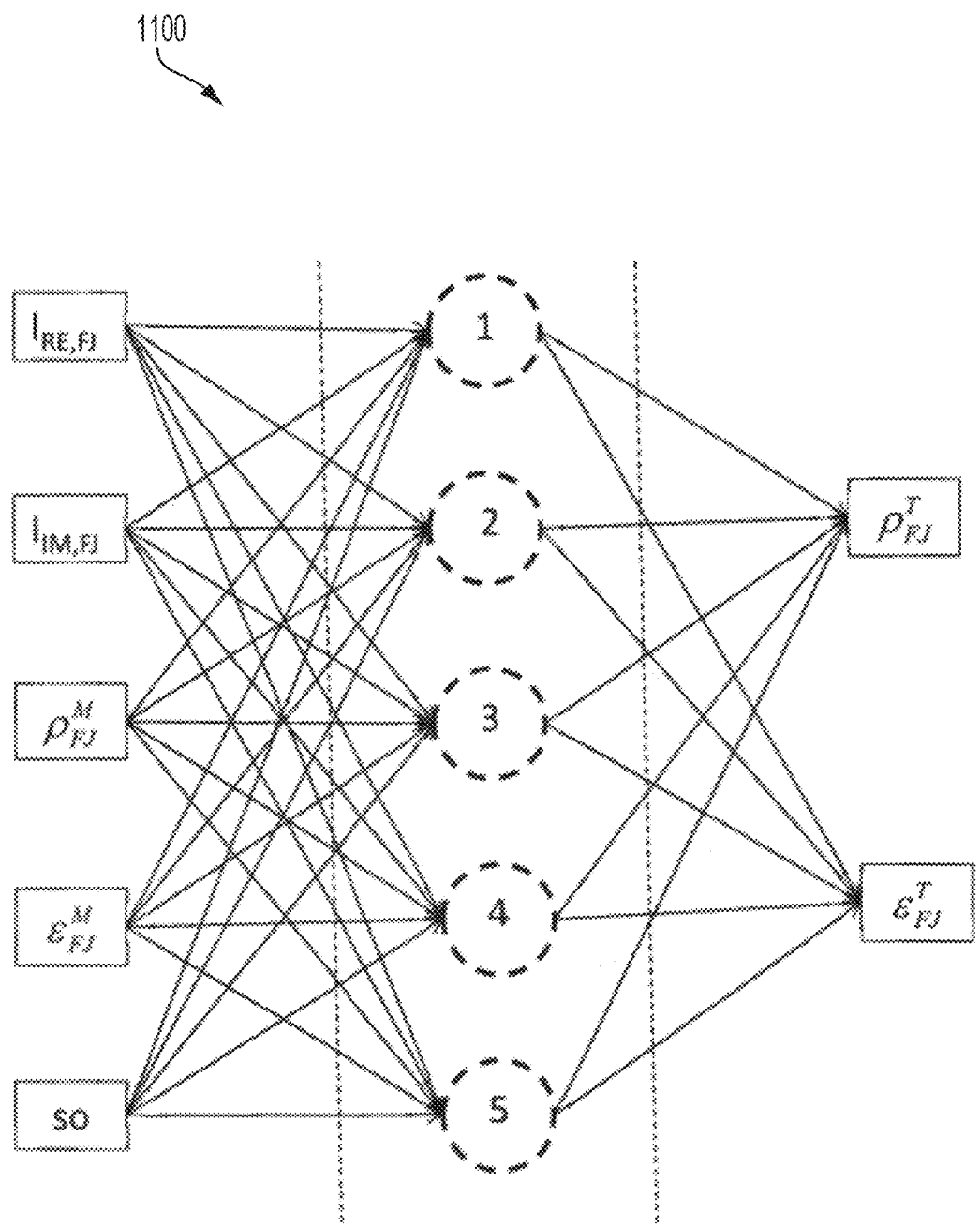
FIG. 11 illustrates an example neural network for generating one or more regression functions to identify values of formation resistivity and permittivity, in accordance with various aspects of the subject technology.

Formation resistivity and formation permittivity are identified after the standoff in the example sequential technique. FIG. 11 illustrates an example neural network 1100 for generating one or more regression functions to identify values of formation resistivity and permittivity. The neural network 1100 shown in FIG. 11 can be formed using the real and imaginary data of a single button at frequency FJ. Further, the previously identified values of mud resistivity at frequency FJ, mud permittivity at frequency FJ, and standoff can also serve as inputs. Alternatively, the neural network 1100 can be generated without the previously identified values of mud resistivity at frequency FJ, mud permittivity at frequency FJ, and standoff.

For each of the neural networks 900, 1000, and 1100 shown in FIGS. 9-11, cross-validation can be performed. As described previously, this can optimize each network by preventing cross-fitting.

Figure 12:
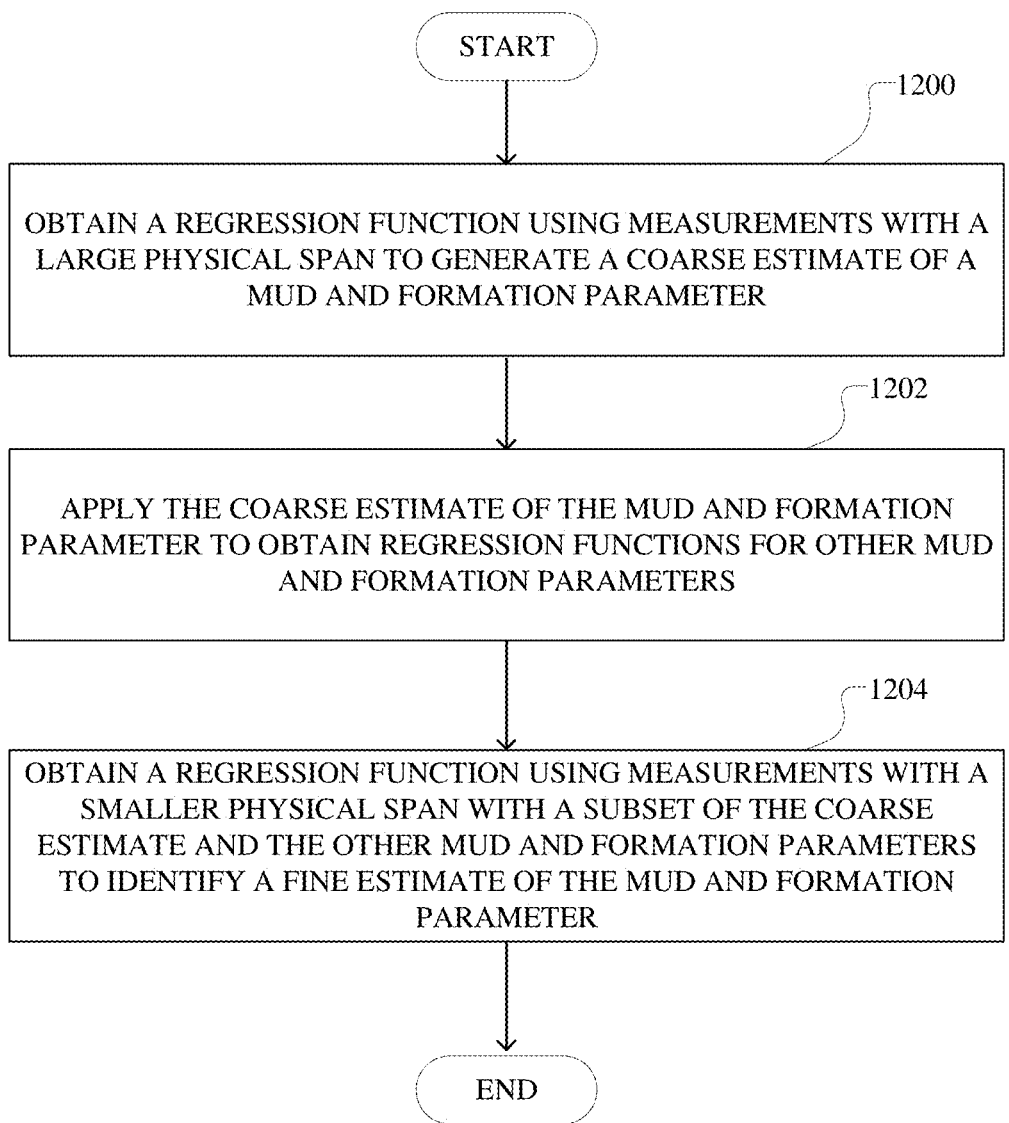
FIG. 12 illustrates a flowchart for an example method of obtaining fine values of mud and formation parameters through coarse estimates of mud and formation parameters, in accordance with various aspects of the subject technology.

The disclosure now continues with a description of a coarse-fine estimate approach for identifying values of mud and formation parameters. FIG. 12 illustrates a flowchart for an example method of obtaining fine regression values of mud and formation parameters through coarse estimates of mud and formation parameters. The method shown in FIG. 12 is provided by way of example, as there are a variety of ways to carry out the method. Additionally, while the example method is illustrated with a particular order of steps, those of ordinary skill in the art will appreciate that FIG. 12 and the modules shown therein can be executed in any order and can include fewer or more modules than illustrated. Each module shown in FIG. 12 represents one or more steps, processes, methods or routines in the method.

At step 1200, a regression function is obtained using measurements with a large physical span to generate a coarse estimate of a mud and formation parameter. For example, a coarse estimate of formation resistivity, formation permittivity or standoff can be obtained through a neural network trained using all of the buttons on a tool. The regression function can be created over the large physical span using the techniques described herein.

At step 1202, the coarse estimate is applied to generate regression functions for other mud and formation parameters. Specifically, the coarse estimate can serve as input to a machine learning technique to generate regression functions for other mud and formation parameters. For example, one or more neural networks can be trained using the coarse estimate to generate regression functions for the other mud and formation parameters.

At step 1204, a fine estimate of the mud and formation parameter is identified using both a subset of the coarse estimate of the mud and formation parameter and the other mud and formation parameters. Specifically, using the regression function obtained for the coarse output, a new training, validation and testing dataset can be created that includes the coarse estimate of the mud and formation parameter as part of the dataset. As follows, the new dataset can be applied to generate a regression function for a fine estimate of the mud and formation parameter. The portion of the new dataset generated using the coarse output can be limited in size or otherwise minimized. This can aid in removing any biases in creating the regression function for the fine estimate.

In various embodiments, the coarse estimate is not actually included in the new dataset for generating the fine estimate. For example, a coarse estimate of the formation resistivity can be used as an input when solving for standoff and formation permittivity in front of each button. As follows, just the identified standoff and formation permittivity of each button along with the measurements from each button can be used to identify a fine estimate of the formation resistivity for the button.

The fine estimate of the mud and formation parameter can correspond to a smaller physical span than the larger physical span used to generate the coarse estimate. For example, data from a single button and the coarse estimate of the formation resistivity can be used to obtain a fine estimate of the formation resistivity. This coarse-fine approach may reduce the noise in outputs by tying the output of a smaller physical span to those in a larger physical span while maintaining a high resolution to detect fine features.

Figure 13:
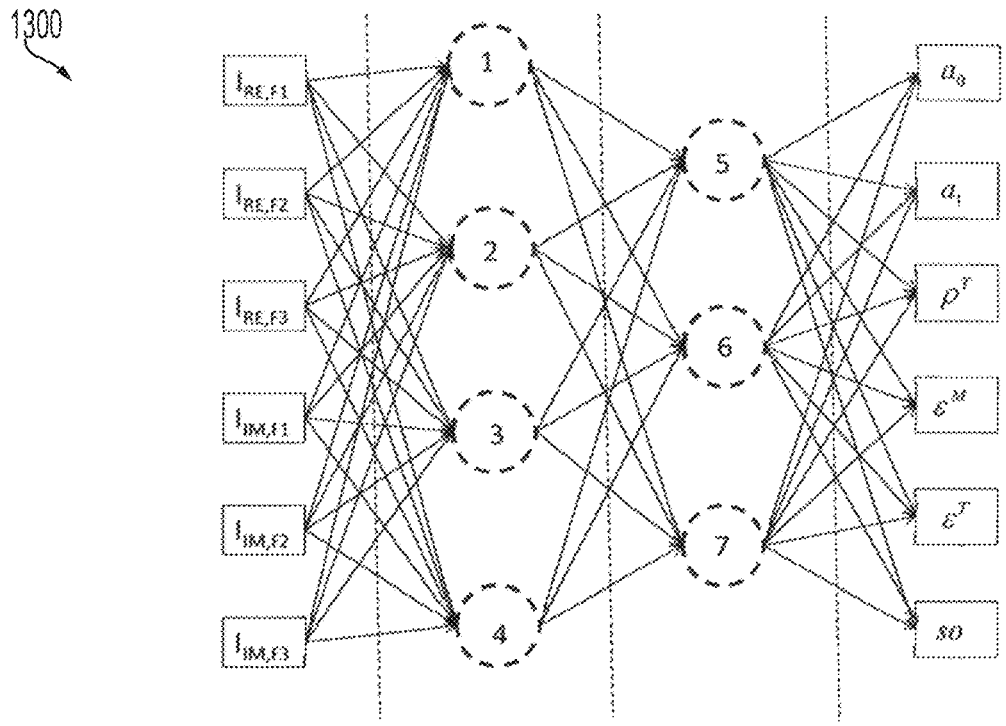
FIG. 13 illustrates an example neural network for mud resistivity that is modified to account for a known empirical form of mud resistivity, in accordance with various aspects of the subject technology.

In various embodiments, if a known empirical form exists for a mud and formation parameter, then the form can be accounted for in an applied machine learning technique to generate one or more regression functions for the mud and formation parameter. FIG. 13 illustrates an example neural network 1300 for mud resistivity that is modified to account for a known empirical form of mud resistivity. The neural network 1300 shown in FIG. 13 is modified from the neural network 700 shown in FIG. 7. Mud resistivity decreases approximately linearly with frequency. This behavior can be estimated as shown in Equation 9.

$$\rho^M(FJ) = a_0 + \frac{a_1}{FJ} \qquad \text{Equation 9}$$

As follows, the modified neural network 1300 can account for the parameters $a_0$ and $a_1$. As apparent in the neural network 1300 shown in FIG. 13, the rest of the parameters from the neural network 700 are the same. Further, the neural network 1300 can be modified to account for other parameters if other known empirical forms exist for the mud and formation parameters. For example, mud permittivity can also be modeled to be linear according to known empirical results.

Figure 14:
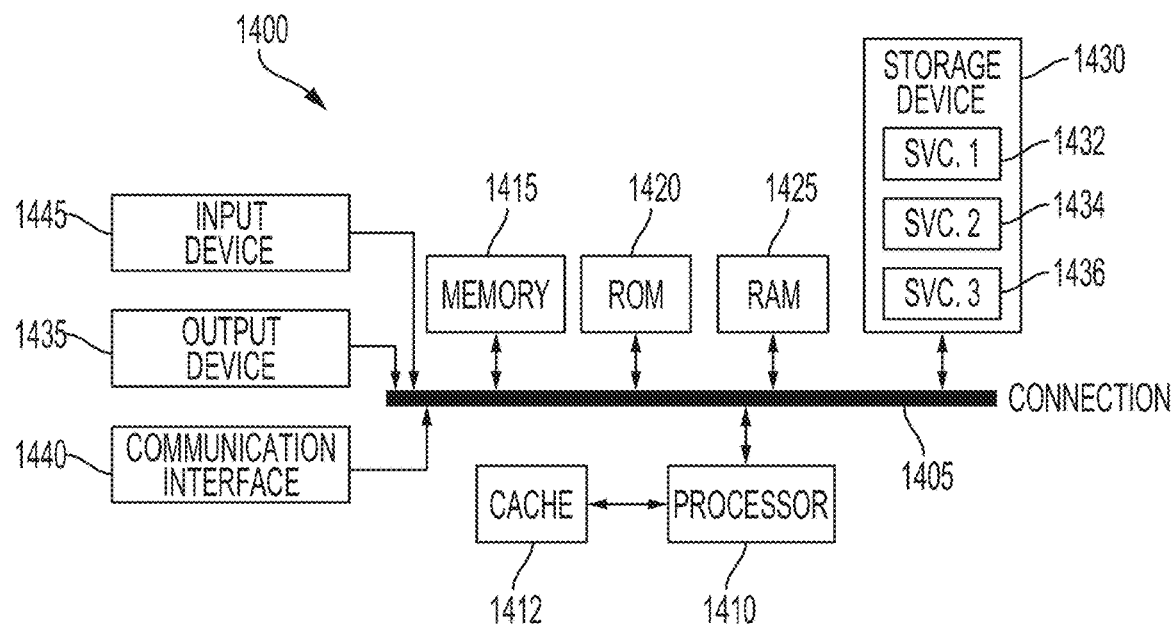
FIG. 14 illustrates an example computing device architecture which can be employed to perform various steps, methods, and techniques disclosed herein.

FIG. 14 illustrates an example computing device architecture 1400 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 14 illustrates an example computing device architecture 1400 of a computing device which can implement the various technologies and techniques described herein. The components of the computing device architecture 1400 are shown in electrical communication with each other using a connection 1405, such as a bus. The example computing device architecture 1400 includes a processing unit (CPU or processor) 1410 and a computing device connection 1405 that couples various computing device components including the computing device memory 1415, such as read only memory (ROM) 1420 and random access memory (RAM) 1425, to the processor 1410.

The computing device architecture 1400 can include a cache of high-speed memory connected directly with, in close proximity to, or integrated as part of the processor 1410. The computing device architecture 1400 can copy data from the memory 1415 and/or the storage device 1430 to the cache 1412 for quick access by the processor 1410. In this way, the cache can provide a performance boost that avoids processor 1410 delays while waiting for data. These and other modules can control or be configured to control the processor 1410 to perform various actions. Other computing device memory 1415 may be available for use as well. The memory 1415 can include multiple different types of memory with different performance characteristics. The processor 1410 can include any general purpose processor and a hardware or software service, such as service 1 1432, service 2 1434, and service 3 1436 stored in storage device 1430, configured to control the processor 1410 as well as a special-purpose processor where software instructions are incorporated into the processor design. The processor 1410 may be a self-contained system, containing multiple cores or processors, a bus, memory controller, cache, etc. A multi-core processor may be symmetric or asymmetric.

To enable user interaction with the computing device architecture 1400, an input device 1445 can represent any number of input mechanisms, such as a microphone for speech, a touch-sensitive screen for gesture or graphical input, keyboard, mouse, motion input, speech and so forth. An output device 1435 can also be one or more of a number of output mechanisms known to those of skill in the art, such as a display, projector, television, speaker device, etc. In some instances, multimodal computing devices can enable a user to provide multiple types of input to communicate with the computing device architecture 1400. The communications interface 1440 can generally govern and manage the user input and computing device output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1425, read only memory (ROM) 1420, and hybrids thereof. The storage device 1430 can include services 1432, 1434, 1436 for controlling the processor 1410. Other hardware or software modules are contemplated. The storage device 1430 can be connected to the computing device connection 1405. In one aspect, a hardware module that performs a particular function can include the software component stored in a computer-readable medium in connection with the necessary hardware components, such as the processor 1410, connection 1405, output device 1435, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising generating one or more regression functions that model mud and formation parameters capable of being identified through an electromagnetic imager tool as a function of possible tool measurements of the electromagnetic imager tool using a known dataset associated with the electromagnetic imager tool. The method can also include gathering one or more tool measurements obtained by the electromagnetic imager tool operating to log a wellbore. Further, the method can include identifying one or more values of the mud and formation parameters by applying the one or more regression functions to the one or more tool measurements. Statement 2. The method of statement 1, wherein the known dataset associated with the electromagnetic imager tool includes previously gathered tool measurements associated with the electromagnetic imager tool corresponding to known values of the mud and formation parameters. Statement 3. The method of statements 1 and 2, wherein the known dataset associated with the electromagnetic imager tool includes simulated tool measurements associated with the electromagnetic imager tool corresponding to values of the mud and formation parameters used in a simulation. Statement 4. The method of statements 1 through 3, wherein the known dataset associated with the electromagnetic imager tool includes tool measurements associated with the electromagnetic imager tool, wherein the tool measurements associated with the electromagnetic imager tool include one or a combination of one or more apparent impedivity measurements at the electromagnetic imager tool, impedance measurements at the electromagnetic imager tool, one or more complex impedance measurements at the electromagnetic imager tool, one or more voltage measurements at the electromagnetic imager tool, one or more current measurements at the electromagnetic imager tool, one or more phase measurements at the electromagnetic imager tool, and one or more absolute values of impedance measurements at the electromagnetic imager tool. Statement 5. The method of statements 1 through 4, wherein the known dataset associated with the electromagnetic imager tool includes auxiliary tool measurements associated with the electromagnetic imager tool, wherein the auxiliary tool measurements associated with the electromagnetic imager tool include one or a combination of one or more caliper measurements of one or more auxiliary tools, one or more frequency measurements of the one or more auxiliary tools, and one or more mud and formation resistivity measurements of the one or more auxiliary tools. Statement 6. The method of statements 1 through 5, wherein the mud and formation parameters include one or a combination of mud permittivity, mud resistivity, standoff, formation permittivity of a formation of the wellbore, and formation resistivity of the formation of the wellbore. Statement 7. The method of statements 1 through 6, wherein the method further comprises identifying a coarse estimate of the mud and formation parameters of the electromagnetic imager tool over a first physical span of the electromagnetic imager tool by applying the one or more regression functions to the one or more tool measurements of the first physical span obtained by the electromagnetic imager tool. The method can also include applying the one or more regression functions, based on the coarse estimate of the mud and formation parameters over the first physical span of the electromagnetic imager tool, to the one or more tool measurements of a second physical span of the electromagnetic imager tool to identify the one or more values of the mud and formation parameters of the electromagnetic imager tool over the second physical span of the electromagnetic imager tool, wherein the second physical span of the electromagnetic imager tool is smaller than the first physical span of the electromagnetic imager tool. Statement 8. The method of statements 1 through 7, wherein the method further comprises training the one or more regression functions using the coarse estimate of the mud and formation parameters over the first physical span of the electromagnetic imager tool to generate one or more fine regression functions for the second physical span of the electromagnetic imager tool. The method can also include applying the one or more fine regression functions to the one or more tool measurements of the second physical span to identify the one or more values of the mud and formation parameters of the electromagnetic imager tool over the second physical span of the electromagnetic imager tool. Statement 9. The method of statements 1 through 8, wherein the method further comprises dividing the mud and formation parameters of the electromagnetic imager tool into specific output groups. The method can also include generating specific regression functions of the one or more regression functions for each of the specific output groups based on the mud and formation parameters of the specific output groups. Further, the method can include applying the specific regression functions for the specific output groups to the one or more tool measurements to identify the one or more values of the mud and formation parameters for the specific output groups. Statement 10. The method of statements 1 through 9, wherein the method further comprises identifying one or more values of a first mud and formation parameter of the electromagnetic imager tool by applying a first regression function of the one or more regression functions to the one or more tool measurements. The method can also include identifying one or more values of a second mud and formation parameters of the electromagnetic imager tool by applying a second regression function of the one or more regression functions to the one or more tool measurements and the one or more values of the first mud and formation parameters. Statement 11. The method of statements 1 through 10, wherein the method further comprises calibrating the one or more tool measurements to the known dataset associated with the electromagnetic imager tool that is used to generate the one or more regression functions before identifying the one or more values of the mud formation parameters. Statement 12. The method of statements 1 through 11, wherein the method further comprises filtering the one or more tool measurements before identifying the one or more values of the mud formation parameters. Statement 13. The method of statements 1 through 12, wherein the method further comprises flattening either or both the known data set associated with the electromagnetic imager tool and the one or more tool measurements. Statement 14. The method of statements 1 through 13, wherein the method further comprises constraining the one or more values of the mud and formation parameters after the one or more values of the mud and formation parameters are identified. Statement 15. The method of statements 1 through 14, wherein the method further comprises selecting the one or more regression functions from a plurality of generated regression functions by applying one or more decision trees based on the mud and formation parameters. Statement 16. The method of statements 1 through 15, wherein the one or more regression functions are generated by training one or more machine learning models with the known dataset associated with the electromagnetic imager tool. Statement 17. The method of statements 1 through 16, wherein the one or machine learning models include at least one of an artificial neural network, an evolutionary model, a random forest regression model, and a support vector regression technique.

Statement 18. A system comprising one or more processors and at least one computer-readable storage medium having stored therein instructions. The instructions which, when executed by the one or more processors, cause the one or more processors to perform operations comprising generating one or more regression functions that model mud and formation parameters capable of being identified through an electromagnetic imager tool as a function of possible tool measurements of the electromagnetic imager tool using a known dataset associated with the electromagnetic imager tool. Further, the instructions can cause the one or more processors to gather one or more tool measurements obtained by the electromagnetic imager tool operating to log a wellbore. Additionally, the instructions can cause the one or more processors to identify one or more values of the mud and formation parameters by applying the one or more regression functions to the one or more tool measurements. Statement 19. The system of statement 18, wherein the one or more regression functions are generated by training one or more machine learning models with the known dataset associated with the electromagnetic imager tool and the one or machine learning models include at least one of an artificial neural network, an evolutionary model, a random forest regression model, and a support vector regression technique.

Statement 20. A non-transitory computer-readable storage medium having stored therein instructions which, when executed by a processor, cause the processor to perform operations comprising generating one or more regression functions that model mud and formation parameters capable of being identified through an electromagnetic imager tool as a function of possible tool measurements of the electromagnetic imager tool using a known dataset associated with the electromagnetic imager tool. The instructions can cause the processor to gather one or more tool measurements obtained by the electromagnetic imager tool operating to log a wellbore. Further, the instructions can cause the processor to identify one or more values of the mud and formation parameters by applying the one or more regression functions to the one or more tool measurements.

What is claimed is:
1. A method comprising:
   generating one or more regression functions that model mud and formation parameters capable of being identified through an electromagnetic imager tool as a function of tool measurements of the electromagnetic imager tool using a known dataset associated with the electromagnetic imager tool;
   gathering one or more tool measurements obtained by the electromagnetic imager tool operating to log a wellbore; and identifying one or more values of the mud and formation parameters by applying the one or more regression functions to the one or more tool measurements, wherein the one or more tool measurements obtained by the electromagnetic imager tool serve as inputs to the one or more regression functions and the output of the one or more regression functions comprise a combination of the mud and formation parameters.

2. The method of claim 1, wherein the known dataset associated with the electromagnetic imager tool includes previously gathered tool measurements associated with the electromagnetic imager tool corresponding to known values of the mud and formation parameters.

3. The method of claim 1, wherein the known dataset associated with the electromagnetic imager tool includes simulated tool measurements associated with the electromagnetic imager tool corresponding to values of the mud and formation parameters used in a simulation.

4. The method of claim 1, wherein the known dataset associated with the electromagnetic imager tool includes tool measurements associated with the electromagnetic imager tool, wherein the tool measurements associated with the electromagnetic imager tool include one or a combination of one or more apparent impedivity measurements at the electromagnetic imager tool, impedance measurements at the electromagnetic imager tool, one or more complex impedance measurements at the electromagnetic imager tool, one or more voltage measurements at the electromagnetic imager tool, one or more current measurements at the electromagnetic imager tool, one or more phase measurements at the electromagnetic imager tool, and one or more absolute values of impedance measurements at the electromagnetic imager tool.

5. The method of claim 1, wherein the known dataset associated with the electromagnetic imager tool includes auxiliary tool measurements associated with the electromagnetic imager tool, wherein the auxiliary tool measurements associated with the electromagnetic imager tool include one or a combination of one or more caliper measurements of one or more auxiliary tools, one or more frequency measurements of the one or more auxiliary tools, and one or more mud and formation resistivity measurements of the one or more auxiliary tools.

6. The method of claim 1, wherein the mud and formation parameters include one or a combination of mud permittivity, mud resistivity, standoff, formation permittivity of a formation of the wellbore, and formation resistivity of the formation of the wellbore.

7. The method of claim 1, further comprising:
identifying a coarse estimate of the mud and formation parameters of the electromagnetic imager tool over a first physical span of the electromagnetic imager tool by applying the one or more regression functions to the one or more tool measurements of the first physical span obtained by the electromagnetic imager tool; and
applying the one or more regression functions, based on the coarse estimate of the mud and formation parameters over the first physical span of the electromagnetic imager tool, to the one or more tool measurements of a second physical span of the electromagnetic imager tool to identify the one or more values of the mud and formation parameters of the electromagnetic imager tool over the second physical span of the electromagnetic imager tool, wherein the second physical span of the electromagnetic imager tool is smaller than the first physical span of the electromagnetic imager tool.

8. The method of claim 7, further comprising:
training the one or more regression functions using the coarse estimate of the mud and formation parameters over the first physical span of the electromagnetic imager tool to generate one or more fine regression functions for the second physical span of the electromagnetic imager tool; and
applying the one or more fine regression functions to the one or more tool measurements of the second physical span to identify the one or more values of the mud and formation parameters of the electromagnetic imager tool over the second physical span of the electromagnetic imager tool.

9. The method of claim 1, further comprising:
dividing the mud and formation parameters of the electromagnetic imager tool into specific output groups;
generating specific regression functions of the one or more regression functions for each of the specific output groups based on the mud and formation parameters of the specific output groups; and
applying the specific regression functions for the specific output groups to the one or more tool measurements to identify the one or more values of the mud and formation parameters for the specific output groups.

10. The method of claim 9, further comprising:
identifying one or more values of a first mud and formation parameter of the electromagnetic imager tool by applying a first regression function of the one or more regression functions to the one or more tool measurements; and
identifying one or more values of a second mud and formation parameter of the electromagnetic imager tool by applying a second regression function of the one or more regression functions to the one or more tool measurements and the one or more values of the first mud and formation parameters.

11. The method of claim 1, further comprising calibrating the one or more tool measurements to the known dataset associated with the electromagnetic imager tool that is used to generate the one or more regression functions before identifying the one or more values of the mud formation parameters.

12. The method of claim 1, further comprising filtering the one or more tool measurements before identifying the one or more values of the mud formation parameters.

13. The method of claim 1, further comprising flattening either or both the known data set associated with the electromagnetic imager tool and the one or more tool measurements.

14. The method of claim 1, further comprising constraining the one or more values of the mud and formation parameters after the one or more values of the mud and formation parameters are identified.

15. The method of claim 1, further comprising selecting the one or more regression functions from a plurality of generated regression functions by applying one or more decision trees based on the mud and formation parameters.

16. The method of claim 1, wherein the one or more regression functions are generated by training one or more machine learning models with the known dataset associated with the electromagnetic imager tool.

17. The method of claim 16, wherein the one or machine learning models include at least one of an artificial neural network, an evolutionary model, a random forest regression model, and a support vector regression technique.

18. A system comprising:
one or more processors; and
at least one computer-readable storage medium having stored therein instructions which, when executed by the one or more processors, cause the one or more processors to perform operations comprising:
generating one or more regression functions that model mud and formation parameters capable of being identified through an electromagnetic imager tool as a function of tool measurements of the electromagnetic imager tool using a known dataset associated with the electromagnetic imager tool;
gathering one or more tool measurements obtained by the electromagnetic imager tool operating to log a wellbore; and
identifying one or more values of the mud and formation parameters by applying the one or more regression functions to the one or more tool measurements,
wherein the one or more tool measurements obtained by the electromagnetic imager tool serve as inputs to the one or more regression functions and the output of the one or more regression functions comprise a combination of the mud and formation parameters.

19. The system of claim 18, wherein the one or more regression functions are generated by training one or more machine learning models with the known dataset associated with the electromagnetic imager tool and the one or machine learning models include at least one of an artificial neural network, an evolutionary model, a random forest regression model, and a support vector regression technique.

20. A non-transitory computer-readable storage medium having stored therein instructions which, when executed by a processor, cause the processor to perform operations comprising:
generating one or more regression functions that model mud and formation parameters capable of being identified through an electromagnetic imager tool as a function of tool measurements of the electromagnetic imager tool using a known dataset associated with the electromagnetic imager tool;
gathering one or more tool measurements obtained by the electromagnetic imager tool operating to log a wellbore; and
identifying one or more values of the mud and formation parameters by applying the one or more regression functions to the one or more tool measurements, wherein the one or more tool measurements obtained by the electromagnetic imager tool serve as inputs to the one or more regression functions and the output of the one or more regression functions comprise a combination of the mud and formation parameters.

21. A method comprising:
generating one or more regression functions that model mud and formation parameters capable of being identified through an electromagnetic imager tool as a function of tool measurements of the electromagnetic imager tool using a known dataset associated with the electromagnetic imager tool;
gathering one or more tool measurements obtained by the electromagnetic imager tool operating to log a wellbore;
identifying one or more values of the mud and formation parameters by applying the one or more regression functions to the one or more tool measurements;
identifying a coarse estimate of the mud and formation parameters of the electromagnetic imager tool over a first physical span of the electromagnetic imager tool by applying the one or more regression functions to the one or more tool measurements of the first physical span obtained by the electromagnetic imager tool; and
applying the one or more regression functions, based on the coarse estimate of the mud and formation parameters over the first physical span of the electromagnetic imager tool, to the one or more tool measurements of a second physical span of the electromagnetic imager tool to identify the one or more values of the mud and formation parameters of the electromagnetic imager tool over the second physical span of the electromagnetic imager tool, wherein the second physical span of the electromagnetic imager tool is smaller than the first physical span of the electromagnetic imager tool.

22. The method of claim 21, further comprising:
training the one or more regression functions using the coarse estimate of the mud and formation parameters over the first physical span of the electromagnetic imager tool to generate one or more fine regression functions for the second physical span of the electromagnetic imager tool; and
applying the one or more fine regression functions to the one or more tool measurements of the second physical span to identify the one or more values of the mud and formation parameters of the electromagnetic imager tool over the second physical span of the electromagnetic imager tool.

23. A method comprising:
generating one or more regression functions that model mud and formation parameters capable of being identified through an electromagnetic imager tool as a function of tool measurements of the electromagnetic imager tool using a known dataset associated with the electromagnetic imager tool;
gathering one or more tool measurements obtained by the electromagnetic imager tool operating to log a wellbore;
identifying one or more values of the mud and formation parameters by applying the one or more regression functions to the one or more tool measurements;
dividing the mud and formation parameters of the electromagnetic imager tool into specific output groups;
generating specific regression functions of the one or more regression functions for each of the specific output groups based on the mud and formation parameters of the specific output groups; and
applying the specific regression functions for the specific output groups to the one or more tool measurements to identify the one or more values of the mud and formation parameters for the specific output groups.

24. The method of claim 23, further comprising:
identifying one or more values of a first mud and formation parameter of the electromagnetic imager tool by applying a first regression function of the one or more regression functions to the one or more tool measurements; and
identifying one or more values of a second mud and formation parameter of the electromagnetic imager tool by applying a second regression function of the one or more regression functions to the one or more tool measurements and the one or more values of the first mud and formation parameters.

* * * * *